(12) United States Patent
Gugel et al.

(10) Patent No.: US 10,775,599 B2
(45) Date of Patent: Sep. 15, 2020

(54) SCANNING MICROSCOPE

(71) Applicant: LEICA MICROSYSTEMS CMS GMBH, Wetzlar (DE)

(72) Inventors: Hilmar Gugel, Dossenheim (DE); Felix Neugart, Mannheim (DE); Ingo Boehm, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 180 days.

(21) Appl. No.: 15/580,288

(22) PCT Filed: Jun. 13, 2016

(86) PCT No.: PCT/EP2016/063509
§ 371 (c)(1),
(2) Date: Dec. 7, 2017

(87) PCT Pub. No.: WO2016/198694
PCT Pub. Date: Dec. 15, 2016

(65) Prior Publication Data
US 2018/0321478 A1 Nov. 8, 2018

(30) Foreign Application Priority Data
Jun. 11, 2015 (LU) .......................................... 92740

(51) Int. Cl.
*G02B 21/00* (2006.01)
*G02B 5/28* (2006.01)
(52) U.S. Cl.
CPC ........... *G02B 21/0064* (2013.01); *G02B 5/28* (2013.01); *G02B 21/0076* (2013.01)
(58) Field of Classification Search
CPC .. G02B 21/0064; G02B 5/28; G02B 21/0032; G02B 21/0048; G02B 21/0076; G01N 21/6458
See application file for complete search history.

(56) References Cited

U.S. PATENT DOCUMENTS

2005/0017197 A1 1/2005 Ulrich et al.
2008/0024782 A1 1/2008 Wolleschensky et al.
(Continued)

FOREIGN PATENT DOCUMENTS

CN 104568873 A 4/2015
DE 102006034908 A1 1/2008
(Continued)

OTHER PUBLICATIONS

U.S. Appl. No. 15/835,473, filed Dec. 8, 2017.

*Primary Examiner* — Wen Huang
(74) *Attorney, Agent, or Firm* — Leydig, Voit & Mayer, Ltd.

(57) ABSTRACT

A scanning microscope includes an objective arranged in an illuminating beam path to focus an illuminating light bundle onto a sample. A scanning unit is arranged upstream of the objective to deflect the illuminating light bundle such that it is focused by the objective executes a scanning movement on the sample. A detection unit is arranged in a detection beam path to receive a detection light bundle not deflected by the scanning unit. For spectral influencing of the detection light bundle, the detection unit contains a spectrally selective component which has an active surface with a spectral edge which varies with the location of incidence of the detection light bundle on the active surface. The active surface is arranged in the detection beam path at the location of an image of an objective pupil, or in a position at which a variation of the spectral edge is compensated for.

28 Claims, 17 Drawing Sheets

(56) References Cited

U.S. PATENT DOCUMENTS

| | | | |
|---|---|---|---|
| 2009/0161208 A1* | 6/2009 | Kempe | G02B 21/0032 |
| | | | 359/385 |
| 2013/0235255 A1 | 9/2013 | Westphal et al. | |
| 2015/0034810 A1 | 2/2015 | Iketaki | |

FOREIGN PATENT DOCUMENTS

| | | |
|---|---|---|
| DE | 102010045856 A1 | 3/2012 |
| DE | 102014008098 A1 | 12/2015 |
| JP | 2012003196 A | 1/2012 |
| WO | WO 2016198694 A1 | 12/2016 |

\* cited by examiner

SCANNING MICROSCOPE

CROSS-REFERENCE TO PRIOR APPLICATIONS

This application is a U.S. National Stage Application under 35 U.S.C. § 371 of International Application No. PCT/EP2016/063509 filed on Jun. 13, 2016, and claims benefit to Luxembourgian Patent Application No. LU 92740 filed on Jun. 11, 2015. The International Application was published in German on Dec. 15, 2016 as WO 2016/198694 A1 under PCT Article 21(2)

FIELD

The invention relates to a scanning microscope comprising an objective arranged in an illuminating beam path for focusing an illuminating light bundle onto a sample, a scanning unit arranged upstream of the objective in the illuminating beam path for deflecting the illuminating light bundle in such a way that the illuminating light bundle focused by the objective executes a scanning movement on the sample, and a detection unit arranged in a detection beam path for receiving a detection light bundle not deflected by the scanning unit, wherein for spectrally influencing the detection light bundle, the detection unit contains at least one spectrally selective component which has an active surface, the spectral edge of the active surface varying with the location of the incidence of the detection light bundle on the active surface. Optical components of this type are also called graduated filters or variable beam splitters or variable filters.

If the spectral properties of the optical components change substantially linearly over the length of the optical component, the variable beam splitters or variable filters are also called linearly variable beam splitters or linearly variable filters.

BACKGROUND

A scanning microscope of the type specified above is used, for example, in fluorescence microscopy, in which fluorescent dyes are stimulated to emit fluorescence radiation with the aid of an illuminating light bundle. In this application, stimulation light in the form of the illuminating light bundle is guided in a scanning movement over the sample. This scanning movement is realized by means of a scanning unit arranged upstream of the objective, said scanning unit generally comprising one or more movable scanning mirrors and a scanning optical system, which directs the illuminating light bundle onto the entry pupil of the objective. The fluorescence radiation stimulated in the sample by the illuminating light bundle is guided back into the scanning microscope by the objective and is fed in the form of a detection light bundle to a detection unit, which generally contains various lenses for shaping and diverting the detection light bundle as well as a detector which finally detects the detection light bundle.

While descanned detectors are conventionally used in confocal microscopy, non-descanned detectors (NDD) are used in other microscopy applications such as, for example, multiphoton microscopy, light sheet or single-plane microscopy or multispot or multi-foci microscopy. A descanned detector firstly receives the detection light bundle after it has been guided back to the scanning unit and has been converted back by said scanning unit into a fixed detection light bundle. A fixed light bundle of this type is also the illuminating light bundle before it strikes the scanning unit. In contrast, a non-descanned detector receives the detection light bundle without this having previously been fed back to the scanning unit. Thus, the detection light bundle arrives at the detector without influencing by the scanning unit.

In multiphoton microscopy, by non-linear effects, only fluorescent dyes in a spatially limited simulating focus, produced by the illuminating light bundle focused on the sample, are stimulated to emit fluorescence radiation. The entire fluorescence radiation which comes from the stimulating focus can now be detected by the non-descanned detector, taking into account the known position of the stimulating focus. Since the illuminating light bundle is guided over the sample in a scanning movement, a three-dimensional sample image can consequently be produced.

Various beam splitters and filters which spectrally influence the detection light bundle in the desired manner are generally located in the detection beam path of a scanning microscope. Thus, beam splitters may, for example, be used to split the detection light bundle into various separate beams depending on the wavelength, which beams are then fed to various detection channels which in each case contain their own detector. The wavelength range to be detected can be determined for each detector by means of optical filters.

In particular, point detectors (for example photomultipliers, avalanche photomultipliers or hybrid photodetectors), line detectors or surface detectors or array detectors (for example CCD, EMCCD, CMOS, sCMOS or QIS (quanta image sensor)) can be used as detectors.

In confocal microscopy, spectral detectors are also increasingly being used which allow the user to freely select the wavelength ranges to be detected before recording the image. In a spectral detector of this type, the detection light bundle is separated, for example by means of a prism, into its spectral proportions and the wavelength ranges to be detected are selected from these.

In contrast, the use of such flexibly usable spectral detectors in non-descanned applications was previously not readily possible as the detection light bundle in the detection unit executes a scanning movement there, which does not occur in the confocal application owing to the return of the detection light bundle to the scanning unit. Non-descanned detectors have therefore hitherto been equipped with conventional interference filters or interference beam splitters, the spectral characteristics of which are fixed, i.e. cannot be varied by the user during the experiment.

It is proposed in DE 10 2006 034 908 A1, in a scanning microscope, to use a spectrally selective component in the form of an edge filter, the limit wavelength of which, also called the spectral edge, varies along the filter (graduated filter). In this case, the spectral edge of the filter separates a wavelength range of the transmission from a wavelength range in which no transmission takes place.

The use of an edge filter of this type with a locally variable spectral edge allows the user to adjust the spectral characteristic of the detector as desired. However, problems also occur here which have been recognized by the present inventors and are not addressed in DE 10 2006 034 908 A1. An adequately steep spectral edge, i.e. an adequately sharp limit wavelength, can only be realized when the detection light bundle striking the filter has an adequately small diameter. Each increase in the bundle diameter inevitably leads to a reduction in edge steepness. The smaller the edge steepness, the less precise is the spectral characteristic of the detector.

Moreover, the spectral edge position of the filter depends on the angle of incidence at which the detection light bundle strikes the filter. The present inventors have recognized that this is disadvantageous, in particular in a non-descanned detector, in which the angle of incidence of the detection light bundle varies as a result of the scanning movement of the illuminating light bundle.

SUMMARY

In an embodiment, the present invention provides a scanning microscope including an objective arranged in an illuminating beam path and configured to focus an illuminating light bundle onto a sample. A scanning unit is arranged upstream of the objective in the illuminating beam path and configured to deflect the illuminating light bundle in such a way that the illuminating light bundle focused by the objective executes a scanning movement on the sample. A detection unit is arranged in a detection beam path and configured to receive a detection light bundle not deflected by the scanning unit, wherein for spectral influencing of the detection light bundle, the detection unit contains at least one spectrally selective component which has an active surface with a spectral edge which varies with the location of incidence of the detection light bundle on the active surface. The active surface of the spectrally selective component is arranged in the detection beam path at the location of an image of an objective pupil, or the active surface of the spectrally selective component is arranged in the detection beam path in a position at which a variation of the spectral edge of the active surface, caused by a variation of an angle of incidence at which the detection light bundle strikes the active surface occurring as a result of the scanning movement of the illuminating light bundle, is compensated for, at least in part, by an opposing variation of the spectral edge of the active surface, which is caused by a variation of the location at which the detection light bundle strikes the active surface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
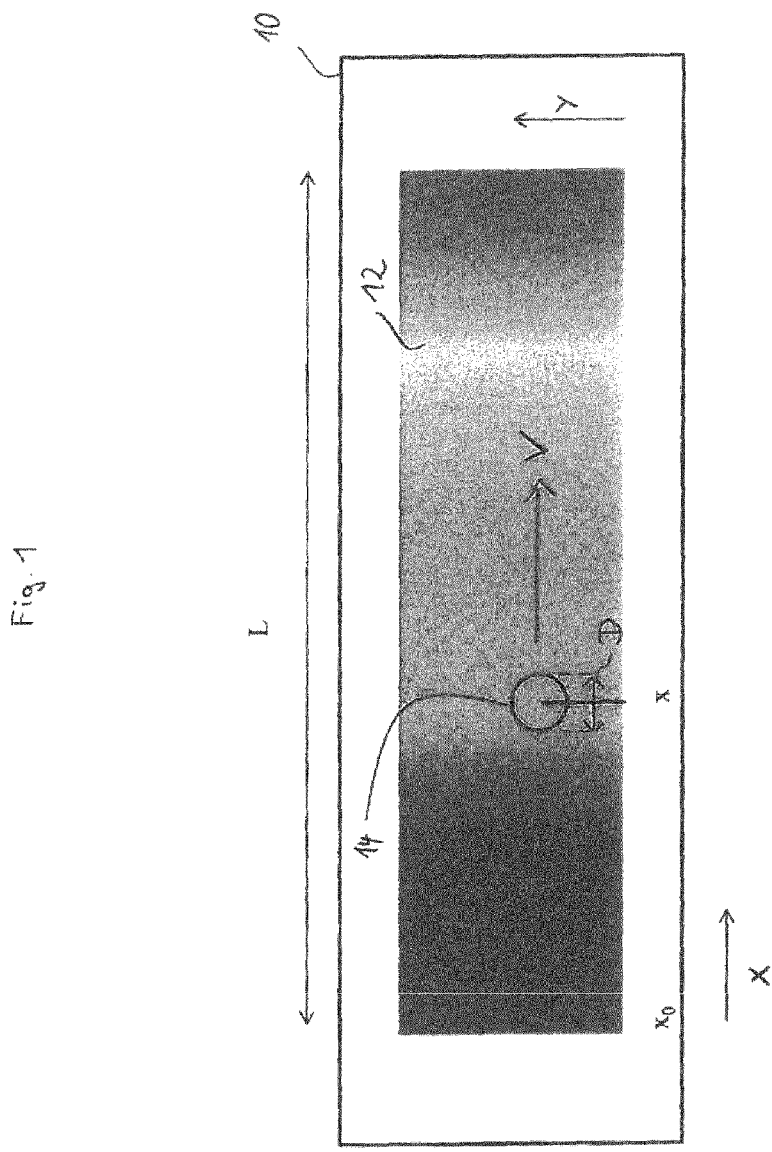
FIG. 1 is a schematic view of a spectrally selective component.

In an embodiment, the present invention provides a scanning microscope of the type mentioned at the outset that is improved in such a way that a flexible and at the same time precise determination of the spectral characteristic of the detection unit is possible in a non-descanned application.

In a first embodiment, the invention provides arranging the active surface of the spectrally selective component in the detection beam path at the location of an image of an objective pupil. In contrast, in a second embodiment, the invention provides arranging the active surface of the spectrally selective component in the detection beam path at a position, at which a variation of the spectral edge of the active surface, which is caused by a variation of the angle of incidence at which the detection light bundle strikes the active surface, said variation occurring as a result of the scanning movement of the illuminating light bundle, is at best partially compensated for by an opposing variation of the spectral edge of the active surface caused by a variation of the location at which the detection light bundle strikes the active surface. In this case, the spectral edge, i.e. the limit wavelength between reflection and transmission, can be defined, for example, as that wavelength at which the transmission is just 50%. However, the spectral edge can also be defined in a different manner.

In other words, the present invention according to an embodiment relates to a scanning microscope having an objective arranged in an illuminating beam path for focusing an illuminating light bundle onto a sample. A scanning unit is arranged upstream of the objective in the illuminating beam path for deflecting the illuminating light bundle in such a way that the illuminating light bundle focused by the objective executes a scanning movement relative to the sample. The scanning microscope comprises a detection unit arranged in a detection beam path for receiving a detection light bundle. This detection beam path is configured in such a way that the detection light bundle is not deflected by the scanning unit and therefore the detection light bundle of this detection beam path does not arrive at the scanning unit. To this extent, this detection beam path is a moving or scanning detection beam path since the detection light bundle executes a scanning movement. For spectrally influencing the detection light bundle, the detection unit contains at least one spectrally selective component which has an active surface with a spectral edge. The spectral edge varies with the location of the incidence of the detection light bundle on the active surface. In the sense of the present invention, the variation of the spectral edge is, in particular, to be taken to mean that, depending on the location of the impingement of the detection light bundle on the active surface of the spectrally selective component, the spectral proportion of the detection light bundle reflected and/or transmitted on the spectrally selective component is changed. According to the first alternative, the active surface of the spectrally selective component is arranged in the detection beam path at the location of an image of an objective pupil. According to the second alternative, the active surface of the spectrally selective component is arranged in the detection beam path at another position of the detection beam path. The other position of the detection beam path is provided in the moving or scanning detection beam path, at which the detection light bundle executes a scanning movement, and the spectrally selective component may be arranged here in such a way that a variation of the location of the incidence of the detection light bundle on the active surface of the spectrally selective component, caused by the scanning movement of the detection light bundle which generally also causes a variation in the angle of incidence of the detection light bundle relative to the active surface of the spectrally selective component is compensated for, at least in part, by an opposing variation of the spectral edge of the active surface.

The first embodiment mentioned above can, in particular, be advantageously applied when the spectrally selective component is arranged with its active surface perpendicular to the optical axis of the detection beam path and the maximum angle of incidence (based on the optical axis), at which the detection light bundle strikes the active surface of the component as a result of its tilting movement caused by the scanning, is not too great. In this case, a displacement of the spectral edge as a result of a variation of the location of incidence of light on the active surface is avoided by the arrangement of the spectrally selective component at the location of the pupil image, while the displacement of the spectral edge caused by variation of the angle of incidence is comparatively small and therefore tolerable. Typically, this applies to angles of incidence which are equal to or less than 35°, in particular equal to or less than 30°, most particularly equal to or less than 20°.

The second embodiment according to the invention is advantageous in particular when the angles of incidence caused by the scanning movement on the spectrally selective component are so great that the edge position displacement depending on the angle of incidence can no longer be tolerated. In this case, the invention provides arranging the active surface of the spectrally selective component in the detection beam path in such a way that it is offset relative to the location of the pupil image along the optical axis. Owing to this arrangement of the active surface, offset relative to the location of the pupil image, as a result of the tilting movement of the detection light bundle, its location of incidence on the active surface changes. This variation of the location of incidence in turn leads to a displacement of the edge position, which can then be used to substantially compensate for the edge position displacement which depends on the angle of incidence.

In other words, the variation of the edge position is compensated for depending on the angle of incidence by a suitable dispersion course of the spectrally selective component, wherein "dispersion" should be taken to mean the change in the spectral edge per section on the active surface of the component.

To allow this compensation, the active surface of the spectrally selective component is not arranged perpendicularly but obliquely to the optical axis of the detection beam path. This oblique position means that in contrast to a perpendicular orientation, the position of the spectral edge changes monotonically with the angle of incidence. It is consequently possible to compensate for the edge position displacement, which depends on the angle of incidence, by the opposing edge position displacement, also running monotonically, which occurs as a result of the variation of the location of incidence of the light on the active surface of the spectrally selective component.

The spectrally selective components are preferably arranged in the beam path in such a way that the reflection plane, i.e. the plane spanned by the incident and reflected beam, is parallel to the variation axis V of the spectrally selective component.

The active surface of the spectrally selective component along the optical axis of the detection beam path preferably has a spacing $\Delta z$ from the location of the image of the objective pupil, which is predetermined depending on the variation of the angle of incidence and therefore the scanning angle of the detection light bundle and the dispersion of the spectrally selective component. The variable $\Delta z$ thus designates the spacing of the active surface of the spectrally selective component from the location of the image of the objective pupil along the optical axis of the detection beam path, wherein the spectrally selective component may lie at the spacing $\Delta z$ before or after the location of the image of the objective pupil. A plurality of spectrally selective elements may also be used simultaneously and may be arranged in part before and in part after the location of the image of the objective pupil.

In this case and in the following, the scanning angle is the angle between the detection light bundle and the optical axis. The symbol $\vartheta$, optionally in combination with a subscript, is used below for scanning angles. Scanning angles in the anticlockwise direction are expressed by positive numbers ($\vartheta > 0$) within the framework of this application and scanning angles in the clockwise direction are expressed by negative ones ($\vartheta < 0$). The angle range of all the scanning angles used is also called the scanning angle range.

Furthermore, in the case of an oblique arrangement of the active surface with respect to the optical axis of the detection beam path, without limitation to the generality (as shown in the drawings), the active surface is arranged at an angle $\varphi > 0$ with respect to the optical axis in such a way that for positive scanning angles $\vartheta$, the spacing between the location of the image of the objective pupil and the location of incidence of light on the active surface is smaller than for negative scanning angles $\vartheta$. The angle of incidence of the detection light bundle can be determined from this angle $\varphi$ and the scanning angle $\vartheta$.

The spacing $\Delta z > 0$ mentioned above is then preferably predetermined in such a way that for all the scanning angles $\vartheta \neq 0$, the following condition is fulfilled:

$$\Delta z \leq 2 \frac{ES(\vartheta, \varphi)}{ED} \frac{\sin(\vartheta + \varphi)}{\sin(\vartheta)}, \quad (1)$$

preferably $$0.2 \frac{ES(\vartheta, \varphi)}{ED} \frac{\sin(\vartheta + \varphi)}{\sin(\vartheta)} \leq \Delta z \leq 1.7 \frac{ES(\vartheta, \varphi)}{ED} \frac{\sin(\vartheta + \varphi)}{\sin(\vartheta)},$$

particularly preferably $$0.5 \frac{ES(\vartheta, \varphi)}{ED} \frac{\sin(\vartheta + \varphi)}{\sin(\vartheta)} \leq \Delta z \leq 1.5 \frac{ES(\vartheta, \varphi)}{ED} \frac{\sin(\vartheta + \varphi)}{\sin(\vartheta)},$$

wherein $ES(\vartheta, \varphi)$ designates the variation of the spectral edge of the active surface at the location of incidence of the beam bundle on the optical axis, said variation occurring at the scanning angle $\vartheta$ and the angle $\varphi$, ($ES(\vartheta, \varphi)$ may also adopt negative values) and ED designates the change of the spectral edge per section on the active surface.

The spacing $\Delta z$ is preferably predetermined in such a way that the deviation of the spectral edge from the desired edge position is as small as possible for all the scanning angles and the edge position displacement, which depends on the angle of incidence, is thus compensated for as well as possible.

In this case, a scanning angle $\vartheta_0$ exists which fulfils the following condition:

$$\Delta z = \frac{ES(\vartheta_0, \varphi)}{ED} \frac{ES(\vartheta_0 + \varphi)}{\sin(\vartheta_0)} \quad (2)$$

The angle $\vartheta_0$ is therefore the scanning angle at which a displacement of the edge position as a result of the variation of the location of incidence is compensated for by the edge position displacement, which depends on the angle of incidence, and simultaneously the deviations from the compensation are approximately optimized in the entire scanning angle range. The angle $\vartheta_0$ is within the scanning angle range.

The oblique position described above of the active surface of the spectrally selective component is preferably realized in such a way that the surface normal of the active surface with respect to the optical axis of the detection beam path is inclined about a predetermined angle.

The angle mentioned above is preferably equal to or less than 65° (for example 45°) and, in a particularly preferred embodiment, the angle mentioned above is in a range from 20° to 40°. The selection of this angle range is based on the following considerations: to achieve a high edge steepness, the beam diameter at the location of the spectrally selective component has to be as small as possible. Furthermore, the demand exists for scanning fields that are as large as possible, i.e. large scanning angles, which results in large numeric apertures of the imaging optical systems used in the detector unit. Large apertures are advantageous just like small angles of incidence at the spectrally selective component, as these also improve the edge steepness.

To optimize the arrangement according to an embodiment of the invention, spacings from the pupil, apertures and diameters of the imaging optical systems used and the dispersion and the angles of incidence may be varied in such a way that a collision of the optical elements is ruled out. In particular, it has been found that with angles of incidence that are too great and spacings of the spectrally selective component from the pupil that are too great, collisions may occur with the imaging optical system arranged downstream in the light path. Furthermore, it has been shown that, in particular, when large numeric apertures are to be retained, angles of incidence that are too small can lead to collisions with optical elements, which are arranged directly upstream or downstream of the spectrally selective component in the light path in reflection. If two spectrally selective components are arranged before and after a pupil, collisions between these elements occur, in particular, when the respective spacing of the component from the pupil is small and, at the same time, the angle of incidence is large.

Against the background of the above considerations, the inventors recognized that to retain large numeric apertures, it is favorable to adjust the angle of incidence of the detection light onto the active surface of the spectrally selective component to between about 20° and about 40°. Because of the lesser dependency of the edge position on the angle of incidence, the dispersion of the respective component and therefore its length can thus be reduced. In addition, it is possible to keep the installation space between the optical elements large to avoid the collisions mentioned.

The active surface of the spectrally selective component is, for example, configured in such a way that its spectral edge varies substantially linearly with the angle of incidence, at which the detection light bundle strikes the active surface. This allows a particularly simple compensation of the edge position displacement, which depends on the angle of incidence, by an opposing edge position displacement, which is caused by a variation in the location of incidence of light on the active surface.

When using the spectrally selective component as a shortpass or longpass filter, a linear change of the spectral edge with the location of the incidence is advantageous. However, the invention is not limited to a linear change of the spectral edge with the location of the incidence of the detection light bundle. In particular, if the spectrally selective component is used as a beam splitter, a non-linear variation of the spectral edge is also conceivable, for example a quadratic variation, an exponential variation or another type of variation.

The active surface of the spectrally selective component may also be configured in such a way that its spectral edge varies in a direction perpendicular to said variation axis with the location of the incidence of the detection light bundle. This embodiment advantageously takes into account the circumstance that in a scanning microscope of the type according to the invention, the sample is generally scanned two-dimensionally. The actual angle of incidence of the detection light bundle on the spectrally selective component is calculated in this case from the cross product of two scanning angles which, in the resulting image, refer, for example, to an axis x and an axis y perpendicular thereto. The axis x corresponds with the variation axis mentioned above. Accordingly, an axis perpendicular to the variation axis corresponds with the y-axis. The two-dimensional scanning of the sample therefore has a dependency of the spectral edge position on the active surface not only in the direction of the variation axis or dispersion axis but also in a direction perpendicular thereto. By a suitable variation of the spectral edge in this perpendicular direction, a change of the spectral edge caused by the change of the angle of incidence in relation to the y-axis can be effectively compensated. For example, the spectrally selective component may be configured in such a way that, on its active surface, lines of the same spectral edge position do not run in a straight line perpendicular to the variation axis or dispersion axis, but are curved in a suitable manner.

The angle of incidence, which varies according to the scanning movement of the illuminating light bundle, at which the detection light bundle strikes the active surface of the spectrally selective component, is preferably limited to an angle range in which the location of the incidence of the detection light bundle on the active surface varies substantially linearly with the angle of incidence. The angle range, within which the angle of incidence varies, may be all the greater here, the smaller the angle, which the surface normal of the active surface encloses with the optical axis of the detection beam path.

The at least one spectrally selective component preferably comprises at least one beam splitter and/or at least one edge filter. The edge filter may in this case comprise at least one shortpass filter, at least one longpass filter and/or at least one bandpass filter.

A bandpass filter of this type is preferably formed from a shortpass filter and a longpass filter, which are arranged one behind the other along the optical axis of the detection beam path.

To make the structure more compact, it may be advantageous to arrange a plurality of spectrally selective components having different filter or splitter regions one behind the other: thus, it is possible for example to provide a first substrate, which has a first filter region or splitter region, in which the spectral edge varies from a minimum value through to an average value. Furthermore, a second substrate may be provided that has a filter region or splitter region, within which the spectral edge, starting from the average value mentioned above, varies up to a maximum value. The first and the second substrate can then be arranged one behind the other in the detection beam path and be used in such a way that that substrate, which contains the desired detection wavelength range or the desired spectral edge, is moved into the detection beam path, while the other substrate is removed from the beam path. In addition, these substrates may also contain regions with high transmission independent of wavelength. As an alternative to removing a substrate from the beam path, this allows the region having the high transmission independent of wavelength to also be able to be moved into the beam path or be able to remain therein.

If the spectrally selective element is perpendicular or virtually perpendicular to the optical axis, in a particularly preferred embodiment, the active surface of the spectrally selective component is configured in such a way that its spectral edge along a variation axis varies linearly with the location of the incidence of the detection light bundle. In this embodiment, the component is a linearly variable edge filter, for example.

The detection unit contains an optical system, for example, which is arranged upstream of the spectrally selective component in the detection beam path and, in a direction parallel to the variation axis, has an optical effect that is different to that in a direction perpendicular to the variation axis. An optical system of this type could for example, be an astigmatic optical system, in particular a cylindrical optical system which has different refractive powers in the directions mentioned. Thus, a cylindrical optical system may, for example, be configured in such a way that it collimates the detection light bundle only in the direction parallel to the variation axis, while it leaves the light bundle divergent in the direction perpendicular thereto to keep the angle of incidence onto the active surface of the spectrally selective component small. An optical system which ensures different imaging conditions in the directions parallel and perpendicular to the variation axis is also conceivable. As a result, the detection light bundle striking the spectrally selective component may, for example, be influenced in such a way that on the active surface of the spectrally selective component, it produces a light spot in the form of an ellipse, the extent of which is greater in the direction perpendicular to the variation axis than in the direction parallel to the variation axis. As a result, the edge position displacement, which is small in any case, which occurs in the direction perpendicular to the variation axis, can be further reduced.

The detection unit preferably has a modular structure with at least two detection modules, the at least one spectrally selective component comprising at least one beam splitter, which feeds the detection light bundle, spectrally separated, to the two detection modules. A modular structure of this type makes it possible to flexibly adapt the scanning microscope according to the invention to the respectively desired application.

In order to change the location of the incidence of the detection light bundle on the active surface, the spectrally selective component can preferably be adjusted by means of a drive. If the active surface of the component is, for example, in the shape of a rectangle, the active surface can be adjusted by means of a corresponding drive along the variation axis running parallel to the long side of this rectangle to adjust the desired spectral edge. On the other hand, if the course of the dispersion is in the shape of a circle, the active surface can be rotated by means of the drive to adjust the edge position.

The position of the active surface can preferably be adjusted, for example by means of a mechanical, pneumatic, electrical drive or one based on the piezoelectric effect. Thus, for example, electric motors could be used to adjust the desired position. An adjustment of this type could be carried out by the user by means of software. However, it is also conceivable to operate a drive of this type in an automated manner. It would also be conceivable to make the spectrally selective components displaceable along the optical axis to allow a flexible adaptation of the spacing $\Delta z$ between the active surface of the spectrally selective component and the location of the image of the object pupil along the optical axis of the detection beam path. A displacement of this type can again preferably take place by means of the types of drives mentioned above and also take place in an automated manner. In all the cases mentioned above, the drives can be activated based on a fixed program sequence or else a control which reacts to specific measuring data, such as the light intensity or beam position. It is conceivable here for the drives to adapt the positions before or else during a measurement. As a result, it would be possible, for example, to dynamically compensate for remaining displacements of the edge position.

The scanning microscope according to the invention, compared to conventional systems which generally work with interference filters and in which the spectral properties are spatially constant over the filter, provides the substantial advantage that by a suitable adjustment of the spectrally selective components used in the scanning microscope, the spectral properties of each individual detection channel can be fixed by the user only shortly before or during the image recording. This advantage becomes all the clearer, the more detection channels are provided. Against this background, the detection unit, in a particularly preferred embodiment, has a beam splitter cascade which comprises at least a first beam splitter and a second beam splitter and at least one first detection module, a second detection module and a third detection module, wherein the first beam splitter feeds the detection light bundle, spectrally separated, by transmission to the first detection module and by reflection to the second beam splitter, and the second beam splitter feeds the detection light bundle reflected by the first beam splitter, spectrally separated, by transmission to the second detection module and by reflection, directly or indirectly via a further beam splitter to the third detection module. This embodiment is based on the knowledge that the spectrally selective components according to the invention, which form the above-mentioned beam splitters, have the property, starting from the spectral edge, of having a greater spectral range of high reflection than transmission. If a non-descanned detection unit having more than two detection modules is now to be constructed, it is advantageous to carry out a cascading of the detection modules, not by means of the transmission but by means of the reflection, to achieve the greatest possible spectral flexibility.

In a further advantageous embodiment, the above-mentioned beam splitters are configured in such a way that the wavelengths of the spectral proportions of the detection light bundle, which the beam splitters feed to the detection modules associated with them in each case by transmission, successively reduce within the beam splitter cascade. Thus, in a detection unit comprising a plurality of detection modules, each individual detection module can only maximally detect the part of the detection light that is not detected by the other detection modules. In this embodiment, it is therefore provided, on the detection light, to guide that spectral proportion having the greatest light wavelengths onto the first detection module in the detection beam path, i.e. onto that detection module which is arranged downstream of the first beam splitter in transmission. Accordingly, that spectral proportion of the detection light, the light wavelengths of which are the second greatest, is guided onto the second detection module within the detection beam path, in other words onto that detection module, which is arranged downstream of the second beam splitter in transmission. The further spectral proportions are then distributed in an analogous manner over the remaining detection modules. The beam splitters are consequently configured as longpass beam splitters.

In cooperation with the embodiment described above, a cascading of the detection modules takes place not only by means of the reflection on the beam splitters, but also by means of the wavelengths of the spectral proportions of the detection light, which are detected by the detection modules.

As the degree of reflection of the beam splitters is generally higher than their degree of transmission, the cascade-like structure of the detection unit provides the advantage of a higher light yield since the detection light, on its way to the respective detection modules, is only transmitted to precisely one of the beam splitters in each case.

A further advantageous embodiment provides at least one first beam splitter, which is arranged upstream of the image of the objective pupil in the detection beam path, and at least one second beam splitter, which is arranged downstream of the image from the objective pupil in the detection beam path. In this case, the respective spacing of the pupil image is fixed in accordance with the above relationships (1) or (2). This also allows a particularly compact structure of the scanning microscope.

The first and the second beam splitter preferably have the same dispersion and are arranged at the same spacing from the image of the objective pupil. As already mentioned above, the dispersion corresponds here to the change of the spectral edge per section on the active surface. This favors a particularly simple and compact structure as well. This applies, in particular, when spectrally selective components are arranged around the respective pupil image in the reflected and in the transmitted beam path.

In a further embodiment, at least two beam splitters are provided which are arranged upstream of the image of the objective pupil at various spacings and have different dispersions, and/or at least two beam splitters which are arranged downstream of the image of the objective pupil at various spacings and have different dispersions. This embodiment is based on the knowledge that the spacing of the respective spectrally selective component from the pupil inter alia depends on the dispersion of the component. This provides the possibility of arranging more than only one spectrally selective component both before the pupil image and after the pupil image, those components, located on the respective side of the associated pupil, having a different dispersion.

In a further advantageous embodiment, the at least one spectrally selective component comprises at least one edge filter which, in at least one of the detection modules having a detector, adjoins the beam splitter without a further imaging optical system. The at least one edge filter is arranged upstream of the detector and its active surface is substantially arranged at the location of an image of the objective pupil. In this embodiment, the at least one edge filter is arranged with its active surface preferably perpendicular to the optical axis of the detection beam path. The at least one edge filter may in turn comprise at least one shortpass filter, at least one longpass filter and/or at least one bandpass filter. If the at least one edge filter is formed from a plurality of components, these are located in the direct vicinity of the pupil image.

The detection unit preferably contains at least one aspherical lens, which is also achromatic in a particularly advantageous embodiment. This embodiment takes into account the circumstance that large apertures occur in the beam path of the non-descanned detection unit. The use of aspherical, achromatic lenses makes it possible to keep the imaging errors occurring with large apertures small.

The active surface of the spectrally selective component is preferably additionally polarization-sensitive. This may, for example, be realized by applying polarization-sensitive regions to the active surface. These polarization-sensitive regions may, for example, be configured as polarizers or polarization splitters. This embodiment is advantageous, in particular, for anisotropic investigations. It also allows the detection light having different polarization directions to be guided into different detection modules.

In a special embodiment, the objective is provided both for focusing the illuminating light bundle onto the sample and for receiving the detection light bundle. This embodiment thus provides a shared objective for the illumination and the detection.

In an alternative embodiment, the objective mentioned is only provided for focusing the illuminating light bundle onto the sample. An optical system, which receives the detection light bundle and transports it onward in the direction of the detection unit, is then located in the detection beam path. The optical system is, for example, an objective or a condenser and collects the detection light coming from the sample.

The properties of a spectrally selective component 10, which is used according to an embodiment of the invention in a non-descanned detection unit for spectrally influencing a detection light bundle, will firstly be described below with reference to FIG. 1.

In the embodiment according to FIG. 1, the spectrally selective component 10 is a variable dichroitic edge filter, for example a longpass filter or a shortpass filter. As a longpass filter, the edge filter transmits the spectrum above a predetermined limit wavelength or spectral edge, while, as a shortpass filter, it transmits the spectrum below a predetermined limit wavelength or spectral edge. However, it should be pointed out that the comments below are not limited to a filter, but also apply accordingly if the component 10 according to the invention forms a spectrally selective beam splitter which transmits the spectrum above the spectral edge, while it reflects the spectrum below the spectral edge in a defined manner (or vice versa).

As shown in FIG. 1, the spectrally selective component 10 has an active surface 12 which has a spectrally effective length L along a variation axis V. In the example according to FIG. 1, the variation axis V is parallel to a longitudinal direction designated x and perpendicular to a width direction designated y.

The component 10 has the property that its spectral edge changes with the location of the incidence of the detection light bundle along the variation axis V. The variation axis V is therefore also called the dispersion axis.

The change in the spectral edge with the location of the incidence of the detection light bundle along the variation axis V may take place linearly or non-linearly, i.e. for example in a quadratic, exponential or other manner. The light spot produced by the detection light bundle on the active surface 12 of the edge filter 10 is designated 14 in FIG. 1. In contrast, the spectral properties of the edge filter 10, in particular its spectral edge, are substantially constant in the width direction y perpendicular to the variation axis V in the embodiment according to FIG. 1.

Since the component 10 is displaced along the variation axis V, the location of incidence of the light spot 14, and therefore the position of the spectral edge, i.e. the limit wavelength, which separates the spectral range of the transmission from the spectral range of the reflection, change. If the wavelength range, within which the spectral edge of the component 10 (starting from a reference value designated $x_0$) can be changed, is designated WR, the variable ED=WR/L indicates the change of the spectral edge position per section on the active surface 12 of the component 10 along the variation axis V if the change of the spectral edge with the location of the incidence of the detection light bundle runs linearly along the variation axis V. The problem now occurs in the spectrally selective component 10 according to FIG. 1 that an increase in the diameter of the light spot 14 designated D in FIG. 1 leads to a reduction in the spectral edge steepness. A spectral range within which the transmission increases from 10% to 90% is defined, for example, as the spectral edge steepness.

Measurements on an exemplary edge filter depending on the diameter D of the light spot 14 have shown that for the structure investigated, the edge steepness ST can be described with good approximation by the following linear relationship:

$$ST = D \times \frac{6 \text{ nm}}{\text{mm}} + 7 \text{ nm}. \tag{3}$$

Furthermore, the spectrally selective component 10 according to FIG. 1 has the property that its spectral edge changes depending on the angle of incidence, at which the detection light bundle strikes the active surface 12.

In general, for beam splitters which are configured for an oblique position relative to the optical axis of φ=45° (and therefore also for an angle of incidence of 45°), an approximately linear relationship is produced between the angle of incidence and displacement of the edge position (and therefore also between the scanning angle ϑ and displacement of the edge position) as long as the scanning angle is not too great.

For a beam splitter, which was configured for an angle of incidence of 45°, exemplary measurements were carried out at a wavelength of 570 nm at a scanning angle range of ϑ=−10° to ϑ=+10°, from which the following linear relationship is produced for the displacement ES of the edge position depending on the scanning angle ϑ (which can in turn be directly calculated from the angle of incidence and the angle φ):

$$ES = \frac{1.55 \text{ nm}}{\text{degree}} \times \vartheta \tag{4}$$

A dependency of the edge position on the angle of incidence, which is however small for small angles of incidence in general, is also produced for spectrally selective components, which are configured as variable dichroitic edge filters for perpendicular angles of incidence.

In general, it applies to interference filters and therefore also to spectrally selective components having a wavelength of the spectral edge $\lambda_{50\%}(\psi_0)$ at a perpendicular incidence, that the wavelength of the spectral edge $\lambda_{50\%}(\psi)$ which, at an angle of incidence w deviating from the perpendicular incidence, can be calculated according to the following formula (Warren J. Smith: Modern Optical Engineering, Third Edition, McGraw-Hill, 2000, page 208):

$$\lambda_{50\%}(\psi) = \lambda_{50\%}(\psi_0)\sqrt{1 - \frac{\sin(\psi)^2}{n^2}} \tag{5}$$

wherein n designates the effective refractive index and $\lambda_{50\%}$ designates the spectral edge, i.e. the wavelength at which the transmission is 50%. This formula can also be used in good approximation to calculate the wavelength of the spectral edge $\lambda_{50\%}$, which occurs in a spectrally selective component, which was conceived for a non-perpendicular angle of incidence and in which the angle of incidence ψ deviates from the angle $\psi_0$ for which the spectrally selective component was conceived.

There is produced from relationship (5) by formation of the differential quotient:

$$\left.\frac{\delta\lambda_{50\%}(\psi)}{\delta\psi}\right|_{\psi_0} = \lambda_{50}(\psi_0)\frac{-\sin(\psi_0)\cdot\cos(\psi_0)}{n^2\cdot\sqrt{1-\frac{\sin(\psi_0)^2}{n^2}}} \tag{6}$$

There is produced by the constant $$b = \frac{\sin(\psi_0) \cdot \cos(\psi_0)}{n^2 \cdot \sqrt{1 - \frac{\sin(\psi_0)^2}{n^2}}}$$

and a change of the angle of incidence $\Delta\psi$, which corresponds to the negative scanning angle, i.e. $\Delta\psi = -\vartheta$:

$$ES(\lambda_{50\%}(\psi_0),\vartheta) = \lambda_{50\%}(\psi_0) \cdot b \cdot \vartheta \qquad (7)$$

Taking into account the circumstance that in the component 10 according to FIG. 1, the position of the spectral edge depends on the location of the incidence of the detection light bundle on the active surface 12, in a special embodiment, the invention provides arranging the active surface 12 of the component 10 within a detection beam path of a scanning microscope at a position at which the detection light bundle (apart from a tilting movement) is stationary, i.e. has a fixed incidence location on the active surface 12. A behavior of this type is shown by the detection light bundle within the detection beam path at the location of an image of an objective pupil. Accordingly, the invention provides in this embodiment, described below with reference to FIG. 2, arranging the active surface 12 of the spectrally selective component 10 at the location of the image of the objective pupil.

Figure 2:
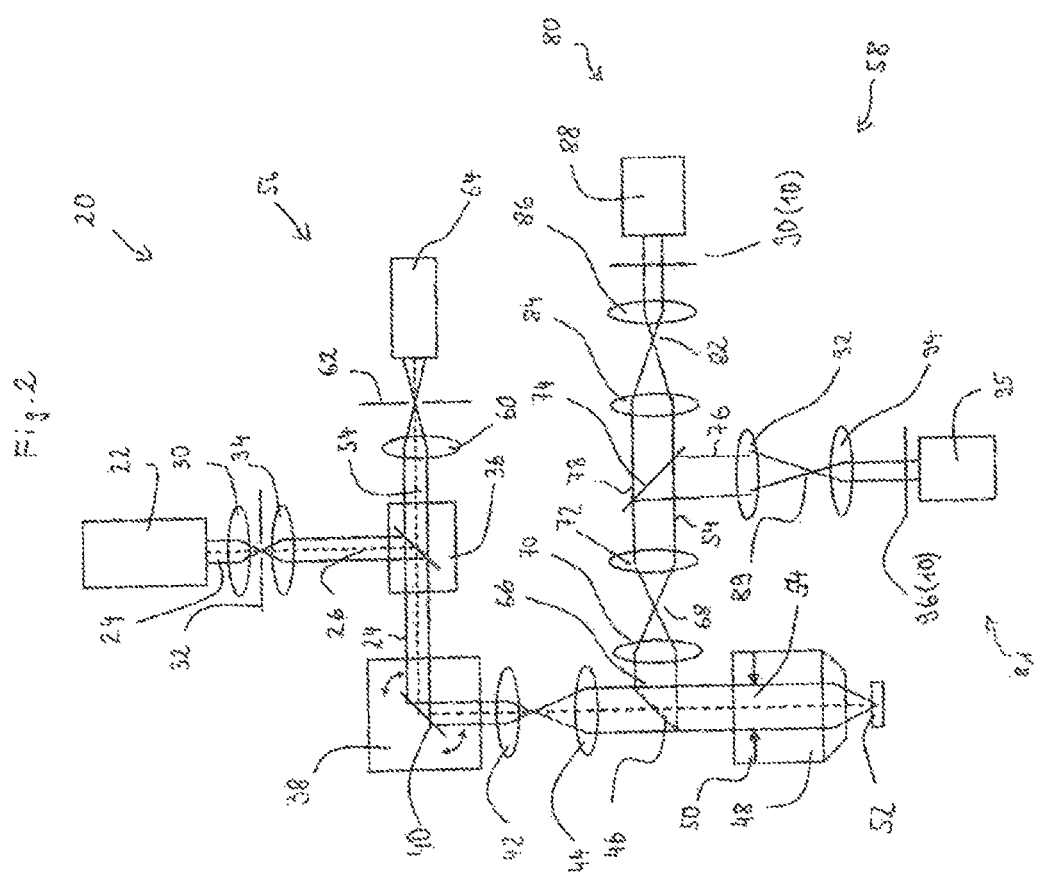
FIG. 2 shows a scanning microscope according to the invention having two spectrally selective components of the type shown in FIG. 1.

FIG. 2 is a purely schematic view of a scanning microscope 20 according to the invention, in which the embodiment mentioned above is realized. The scanning microscope 20 contains a stimulating light source 22 which emits an illuminating light bundle 24 along an illuminating beam path 26. The illuminating light bundle 24 is focused by a lens 30 onto a stimulating pinhole aperture 32. After passage through the stimulating pinhole aperture 32, a further lens 34 directs the illuminating light bundle 24 onto a beam splitter 36, which diverts the illuminating light bundle 24 onto a scanning unit 38, which contains one or more movable scanning mirrors 40. By means of a scanning optical system 42 and a further lens 44, the illuminating light bundle 24 diverted with the aid of the scanning unit 38 in a scanning movement strikes a beam splitter 46. After passage through the beam splitter 46, the illuminating light bundle 24 arrives in an objective 48 which has an objective pupil 50. The objective 48 finally focuses the illuminating light bundle 24 onto a sample 52.

With the aid of the scanning unit 38, the illuminating light bundle 24 is deflected in such a way that the illuminating light bundle that has passed through the objective 48 carries out a scanning movement on the sample 52. Owing to the illuminating light bundle 24, fluorescence radiation, which is guided through the objective 48 in the form of a detection light bundle 54 back into the scanning microscope 20, is thus stimulated in the sample 52.

In the embodiment according to FIG. 2, the detection light bundle 54 is fed to two separate detection units designated in general 56 or 58 in FIG. 2. The detection unit 56 receives the detection light bundle 54 once it has been guided back to the scanning unit 38. The detection unit 56 thus forms a descanned unit. In comparison, the detection unit 58 receives the detection light bundle 54 without this having been influenced by the scanning unit 38. The detection unit 58 is therefore a non-descanned unit.

The descanned detection unit 56 contains a lens 60, which focuses the detection light bundle 54, once this has been diverted by the scanning unit 38 and has been guided through the beam splitter 36, onto a detection pinhole aperture 62. A detector 64, which receives the illuminating light bundle 54, is arranged downstream of the detection pinhole aperture 62. It should be pointed out at this point that the beam splitter 46, for example, can be pivoted out of the beam path or is transmissive in part to the fluorescence radiation.

The non-descanned detection unit 58 is located in a detection beam path 66, which is branched off from the illuminating beam path 26 by the beam splitter 46. On both sides of an intermediate image plane 68 in which an intermediate image of the sample 52 is produced, the non-descanned detection unit 58 in each case contains a lens 70 or 72. A beam splitter 74 is arranged downstream of the lens 72 in the detection beam path 66. The beam splitter 74 separates the detection light bundle 54 into two partial bundles 76 and 78, which are fed to two separate detection modules designated in general as 80 and 81 in FIG. 2.

On both sides of an intermediate image plane 82 in which an intermediate image of the sample 52 is produced, the detection module 80 in each case has a lens 84 or a lens 86. The lens 86 directs the detection light bundle 54 onto a detector 88, upstream of which is arranged a detection filter 90.

On both sides of an intermediate image plane 89 in which an intermediate image of the sample 52 is also produced, the detection module 81 accordingly in each case has a lens 92 or a lens 94. The lens 94 directs the detection light bundle 54 onto a detector 95. A detection filter 96 is arranged upstream of the detector 95.

It should be pointed out that, in the arrangement according to FIG. 2, the beam splitters 36, 46 and 74 are in each case dichroic and let through or reflect the light striking them depending on the wavelength. Thus, the beam splitter 36 has the property of reflecting light in the wavelength range of the illuminating light bundle 24 and letting through light in the wavelength range of the detection light bundle 54. Accordingly, the beam splitter 46 reflects light in the wavelength range of the detection light bundle 54, while it lets through light in the wavelength range of the illuminating light bundle 24. The beam splitter 74 in turn lets through a part of the detection light bundle 54, while it reflects the remaining part.

Furthermore, it should be pointed out that, in the view according to FIG. 2, the illuminating light bundle 24 and the detection light bundle 54 partially overlap one another. Thus, for example, the beam path between the beam splitter 46 and the sample 52 forms a common beam path for the two light bundles 24 and 54.

In the special embodiment according to FIG. 2, the detection filters 90 and 96 in each case form a spectrally selective component of the type shown in FIG. 1. Accordingly, the reference numeral 10, which designates the spectrally selective component in FIG. 1, is placed in brackets in each case after the detection filter 90 and 96 in FIG. 2.

In the special embodiment according to FIG. 2, the detection filters 90 and 96 are arranged within the detection beam path 66 in such a way that they are in each case located at the location of an image of the objective pupil 50. This arrangement of the detection filters 90 and 96 has the advantage that the location of incidence of light on the active surface 12 of the detection filter 90 or 96 remains constant. Consequently, no edge position displacement depending on the location of the light incidence occurs.

In particular if the scanning movement of the illuminating light bundle 24 produced by the scanning unit 38 and therefore the corresponding tilting movement of the detection light bundle 54 at the location of the pupil image are comparatively small, only a small angle-dependent displacement ES of the spectral edge is also produced. Therefore, the embodiment according to FIG. 2 is an advantageous solution for scanning angles that are not too large.

In certain circumstances, however, it may be problematic to arrange the spectrally selective component 10 according to FIG. 1 at the location of the image of the objective pupil 50. This applies, in particular, if the spectrally selective component 10 was configured for a larger angle of incidence, such as, for example, 35° or 45°. This is often the case for spectrally selective beam splitters. This is to be illustrated in turn below with the aid of a specific numeric example.

Under the assumption, by way of example, that the objective 48 according to FIG. 2 has a magnification of 20 and a numeric aperture of 1.00, for a tube lens focal length of 200 mm, an objective pupil diameter of 20 mm is produced. For a field of view having an edge length of 0.775 mm, scanning angles of up to ±2.2° result therefrom in the objective pupil 50 (based on the optical axis). In the detection beam path 66, the detection light bundle 54 with an imaging with the imaging scale 1 at a location, at which the image of the objective pupil 50 is located, then in turn has a diameter of 20 mm and a maximum scanning angle of ±2.2°.

If the scanning angle given above is inserted in the relationship (4), an angle-dependent edge position displacement of ±3.41 nm is produced, which is a very tolerable value. However, if the diameter of 20 mm is inserted in the relationship (3), a value of 127 nm is produced for the edge steepness ST, which is an unacceptably large value for a series of applications.

The diameter of the detection light bundle 54 can certainly be reduced by suitable imaging, for example a 10-fold reduction of the objective pupil 50 which, taking into account the relationship (3), leads to a tolerable edge steepness ST of 19 nm. However, this reduction in the bundle diameter by the factor 10 is accompanied by an enlargement of the maximum scanning angle, also by the factor 10, i.e. the maximum scanning angle is increased to a value of ±22°. Taking into account the relationship (4), there is produced from this for the selected numeric example, an unacceptable, angle-dependent edge position displacement ES of ±34.1 nm, i.e. a displacement of the edge position of more than 68 nm between the lateral edges of the field of view.

To solve this problem, the arrangement of the spectrally selective component 10 not at the location of the image of the objective pupil 50, but at the location of the intermediate image of the sample 52 (designated 68, 82 and 89 in FIG. 2) could be considered. However, it should be remembered that even in this solution, an imaging has to be selected, which images the sample 52 on a small region of the spectrally selective component 10 to obtain a similar edge position on the component 10 for all the sample points. An imaging of this type leads, however, to a large widening of the detection light bundle 54, i.e. to a relatively large beam cone, on the spectrally selective component 10 and therefore in turn to very different edge positions for the individual beams within the beam cone. In total, by averaging over the filter functions of the individual beams of the beam cone, a small edge steepness ST is then in turn produced.

To avoid the above problems, the invention provides, in an alternative embodiment to the arrangement according to FIG. 2, the arrangement of the spectrally selective component 10 in the detection beam path at a position spaced apart from the image of the objective pupil 50, at which the edge position displacement as a result of the varying angle of incidence is compensated for in that the detection beam bundle for each angle of incidence strikes a different location of the spectrally selective component 10 along the variation axis V (i.e. in the direction x). As the position of the spectral edge along the variation axis V changes, the angle-dependent edge position displacement can thus be substantially compensated for if the change of the position of the spectral edge along the variation axis V is suitably selected.

It will be described below with reference to FIGS. 3, 4 and 5, how the spacing of the active surface 12 of the spectrally selective component 10 from the location of the image of the objective pupil 50 is predetermined in such a way that the angle-dependent edge position displacement is compensated for by an opposing edge position displacement, which is produced from the fact that the tilting movement of the detection light bundle 54 leads to a variation of the location of incidence of light along the variation axis V on the active surface 12.

Figure 3:
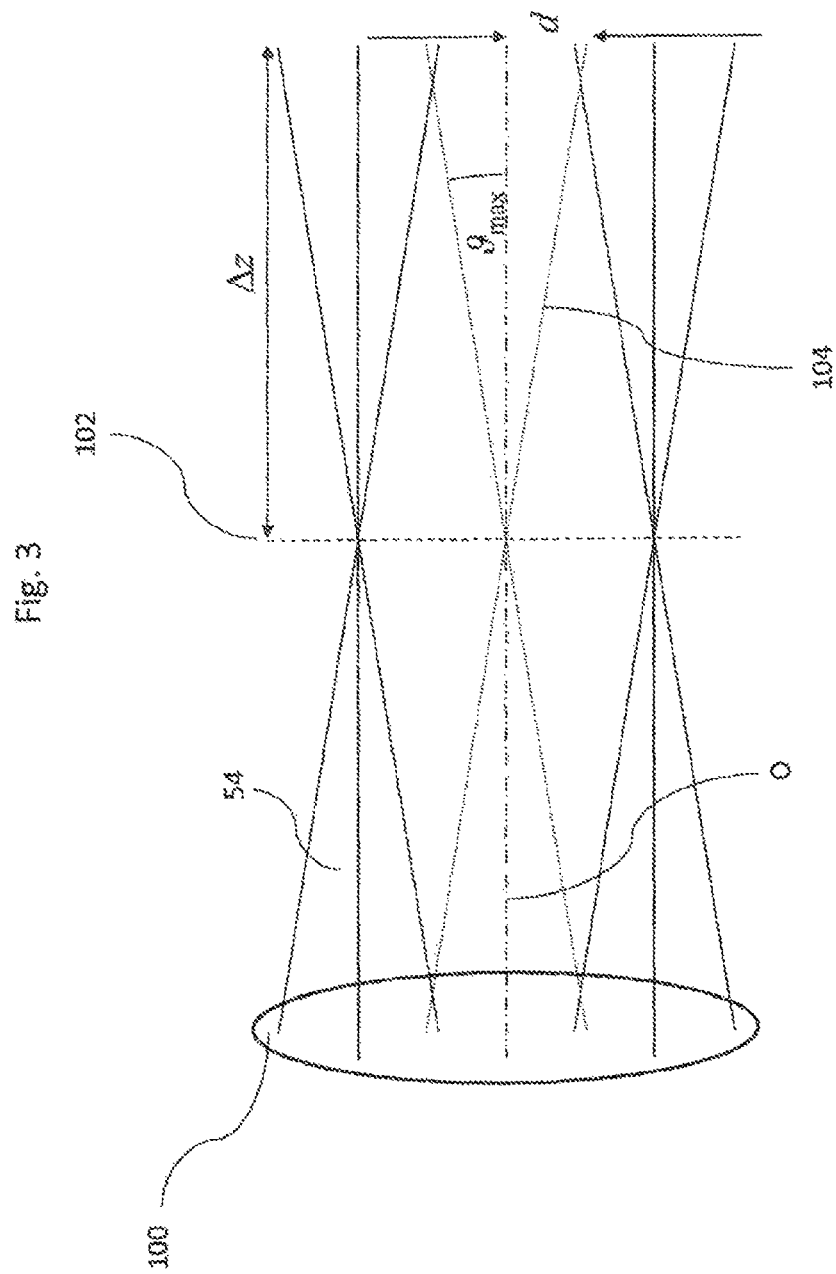
FIG. 3 is a schematic view illustrating the tilting movement of the detection light bundle produced by the scanning.

The tilting movement mentioned above of the detection light bundle 54 within the detection beam path 66 is illustrated in FIG. 3. In this case, the reference numeral 100 in FIG. 3 designates a lens which is arranged in the detection beam path 66 and is arranged upstream of a plane 102, in which the image of the objective pupil 50 is located. Furthermore, $\Delta z$ designates the spacing measured along the optical axis O of the detection beam path 66 from the plane 102.

As FIG. 3 shows, the detection light bundle 54 carries out a tilting movement which corresponds to the scanning movement of the illuminating light bundle 24 and leads to the fact that the detection light bundle 54 is spatially displaced outside the plane 102 of the pupil image. In contrast, the detection light bundle 54 in the plane 102 is stationary. The maximum scanning angle, which characterizes this tilting movement of the detection light bundle 54, is designated $\vartheta_{max}$ in FIG. 3. In this case, the scanning angle $\vartheta_{max}$ indicates an angle which a central beam 104 of the detection light bundle 54 encloses with the optical axis O. The central beam 104 forms the central bundle axis of the detection light bundle 54. The spatial displacement of the detection light bundle 54 corresponding to the maximum scanning angle $\vartheta_{max}$ at the spacing $\Delta z$ is designated d in FIG. 3.

Figure 4:
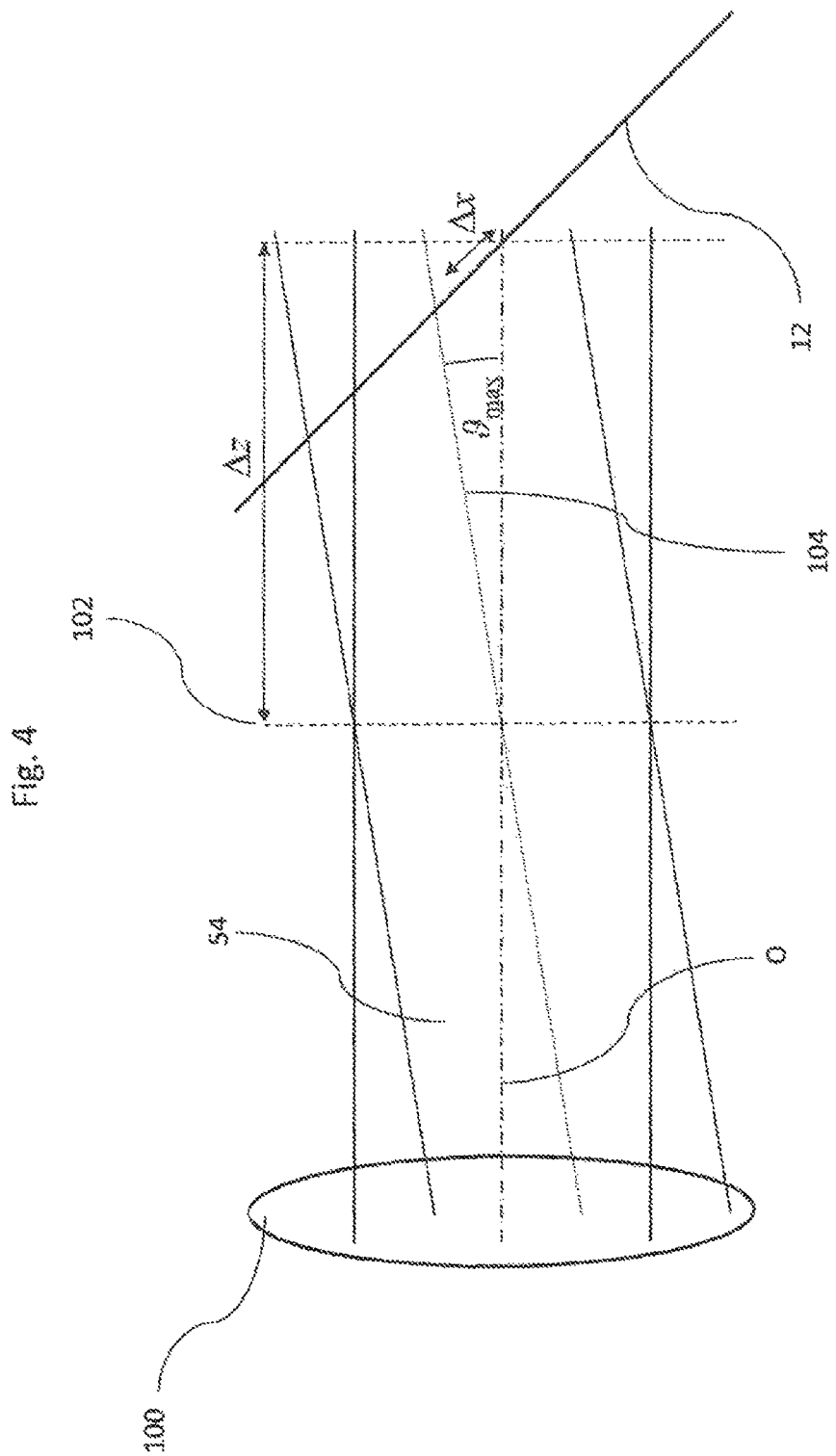
FIG. 4 is a schematic view showing the oblique position of the active surface of the spectrally selective component.

In the view according to FIG. 4, the arrangement according to the invention of the active surface 12 of the spectrally selective component 10 is shown purely schematically. It should be noted here that only half the tilting movement of the detection light bundle 54 is shown in FIG. 4 for the sake of clarity.

To allow the edge position displacement depending on the scanning angle to be compensated for by an opposing edge position displacement depending on the location of incidence of light on the active surface 12, the active surface 12 is arranged in the detection beam path 66 in such a way that it does not enclose an angle of 90° with the optical axis O but a smaller angle φ. Thus, the arrangement of the active surface 12 at an angle of 90° at the spacing $\Delta z$ from the plane 102 would lead to the edge position displacement caused by the variation of the scanning angle on both sides of the optical axis O ($-\vartheta$, $+\vartheta$) having the same sign, while the edge position displacement caused by the variation of the location of incidence of light on the active surface 12 on both sides of the optical axis O has different signs. The desired compensation of the angle-dependent edge position displacement by the edge position displacement depending on the location of incidence is therefore not possible in an arrangement of the active surface 12 perpendicular to the optical axis O in the entire scanning range. In contrast, by means of the oblique arrangement of the active surface 12 at the angle φ, which is smaller than 90°, an edge position displacement is achieved, which changes monotonically with the angle at which the detection light bundle 54 strikes the active surface 12.

The desired compensation of the edge position displacement depending on the scanning angle by an opposing edge position displacement depending on the location of incidence of light on the active surface 12 is achieved if the following condition is fulfilled:

$$\Delta x \frac{\partial \lambda_{50\%}}{\partial x} = -\Delta \psi \frac{\partial \lambda_{50\%}}{\partial \psi} \qquad (8)$$

wherein $$\frac{\partial \lambda_{50\%}}{\partial x} = ED$$

designates the change of the spectral edge per section on the active surface. ED is also called the dispersion of the variable filter or of the variable beam splitter.

There follows from the views according to FIGS. 3 and 4:

$$\Delta x = \Delta z \frac{\sin \vartheta}{\sin(\vartheta + \varphi)} \qquad (9)$$

A linear fit-function for relationship (9), which can be determined, for example, by Taylor development, states:

$$\Delta x = \Delta z \cdot k \cdot \vartheta, \qquad (10)$$

wherein k designates a constant.

The spacing Δz of the active surface 12 of the spectrally selective component 10 from the plane 102, i.e. the location of the image of the objective pupil 50, can be calculated from the relationship (8) and the relationship (9) according to relationship (2) given above.

Alternatively, the required dispersion $$ED = \frac{\partial \lambda_{50\%}}{\partial x}$$

can be calculated for a given Δz.

There is produced from the relationship (7), the relationship (8) and the relationship (10):

$$\frac{\partial \lambda_{50\%}}{\partial x} = -\frac{\partial \lambda_{50\%} \cdot b}{\Delta z \cdot k} \qquad (11)$$

The following relationship is a solution for the relationship (11):

$$\lambda_{50\%}(x, \psi_0) = \lambda_0 \exp\left(\frac{-b}{\Delta z \cdot k} \cdot x\right) \qquad (12)$$

wherein $\lambda_0$ designates the starting wavelength, i.e. the wavelength at the zero point of the x coordinate.

For the approximations made here along the variation axis, the spectral edge of the spectrally selective component varies exponentially with the location of the incidence of the detection light bundle. The dispersion implemented in the structure depends on the behavior of the filter, so that a connection other than the exponential course may also be the best solution.

Figure 5:
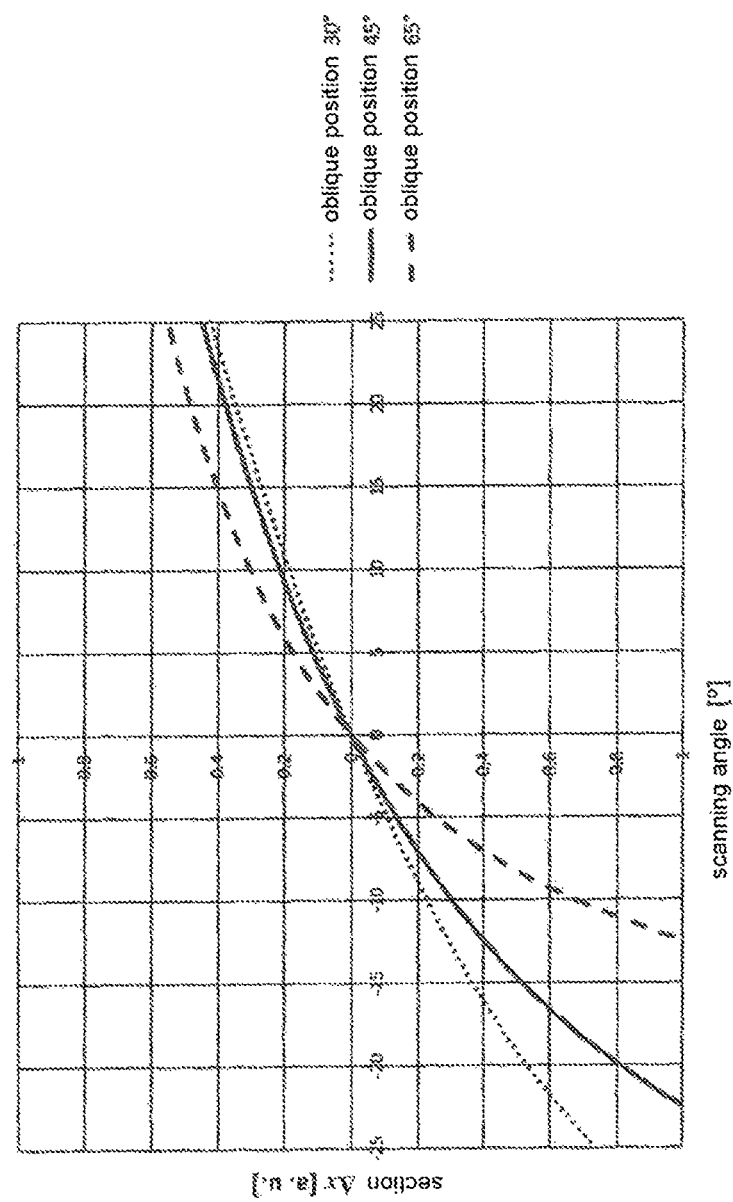
FIG. 5 is a graph showing the connection between the scanning angles and the location of incidence of light on the active surface of the spectrally selective component for different oblique positions of the active surface.

FIG. 5 shows the connection between the scanning angle, at which the detection light bundle 54 (more precisely its central beam 104, cf. FIG. 4) strikes the active surface 12, and the section Δx on the active surface 12. This connection is indicated in FIG. 5 for three different oblique positions of the active surface 12, wherein it should be pointed out that the three angle details in FIG. 5 (in contrast to the definition of the angle (p in FIG. 4) in each case designate the angle of the surface normal of the active surface 12 relative to the optical axis O of the detection beam path 66.

As is to be inferred from the view according to FIG. 5, the connection between the scanning angle and the section Δx on the active surface 12 can be approximated all the better with the aid of a linear relationship, the less the oblique position of the active surface 12 deviates from a right-angled arrangement relative to the optical axis O.

Figure 6:
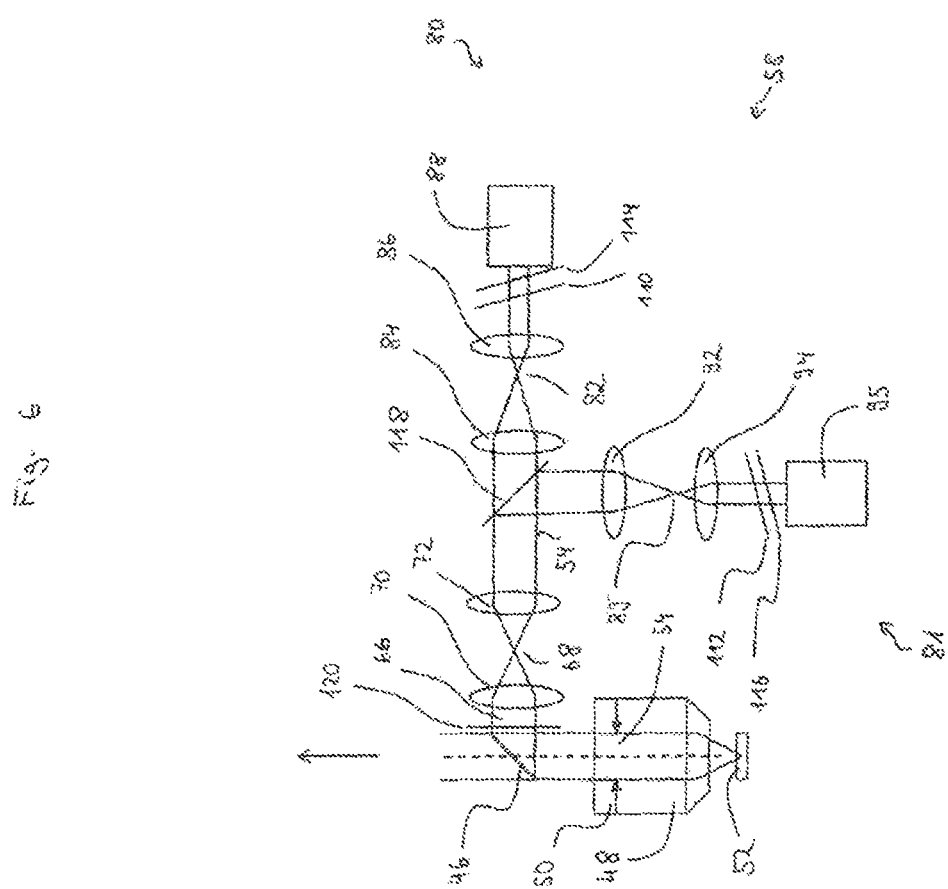
FIG. 6 shows a further embodiment of the scanning microscope according to the invention having two pairs of filters placed obliquely.
Figure 7:
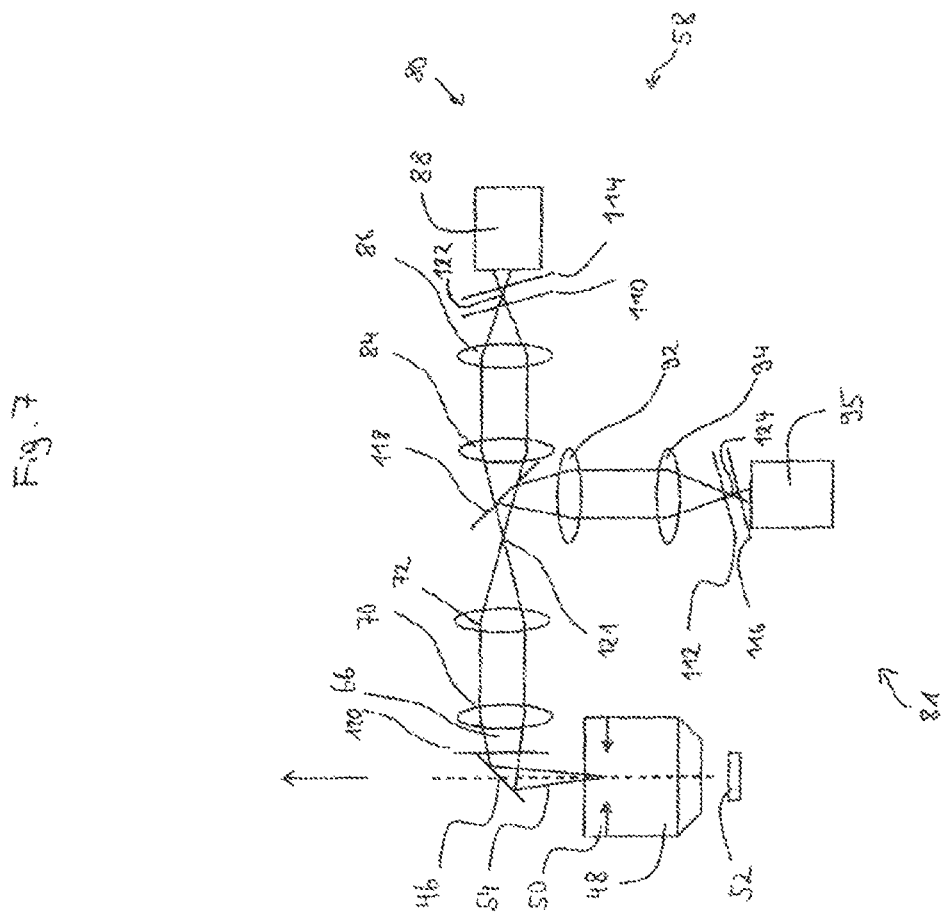
FIG. 7 shows the beam path of the pupil imaging for the embodiment shown in FIG. 6.

FIGS. 6 and 7 show a modified embodiment of the scanning microscope 20 shown in FIG. 2, in which the compensation described above of the angle-dependent edge position displacement by an opposing edge position displacement, which is caused by a variation of the location of the incidence of light on the spectrally selective component 10, is used. In this case, in FIGS. 6 and 7, those components which correspond to the components used in the embodiment according to FIG. 2 are provided with the reference numerals already used in FIG. 2. In FIG. 6 moreover, only those components are shown which are part of the non-descanned detection unit 58 or directly cooperate therewith. The same applies to all the other embodiments which are described below with reference to FIGS. 8 to 17.

In contrast to the embodiment according to FIG. 2, the embodiment shown in FIG. 6 contains a pair of filters, formed from a longpass filter 110 or 112 and a shortpass filter 114 or 116, before each of the two detectors 88 and 95. The two pairs of filters therefore in each case form a bandpass filter having two spectral edges, which can be variably adjusted independently of one another. Each of the filters 110, 112, 114 and 116 is placed obliquely in accordance with the view in FIG. 4 to achieve the desired monotonic edge position displacement depending on the angle of incidence.

The arrangement according to FIG. 6 furthermore contains a beam splitter 118 which, like the filters 110, 112, 114 and 116, is a spectrally selective component of the type shown in FIG. 1. The beam splitter 118 is arranged with its active surface at an angle of 45° to the optical axis of the detection beam path 66.

Furthermore, the arrangement according to FIG. 6 additionally has a blocking filter 120, which is arranged upstream of the lens 70 in the detection beam path 66. The blocking filter 120 is used to block the stimulating light reflected in the sample 52, the intensity of which is greater by a multiple than the intensity of the detected fluorescent light.

FIG. 7 shows the beam path of the pupil imaging, which belongs to the arrangement according to FIG. 6. In the view according to FIG. 7, within the detection beam path 66, those locations can be seen in which an image of the objective pupil 50 is located in each case. These are designated 121, 122 and 124 in FIG. 7. The beam splitter 118 is arranged downstream of the location 121 of the pupil image at a spacing which is predetermined according to the condition (1) or (2) given above. The same applies to the pair of filters formed from the filters 110 and 114 and the pair of filters formed from the filters 112 and 116, the filters 110, 112 in each case being arranged upstream of the location of the pupil image and the filters 114, 116 in each case being arranged downstream of the location of the pupil image. The spacings of the filters 110 and 114 from the location of the pupil image are the same here in terms of amount. The same applies to the pair of filters 112, 116.

Figure 8:
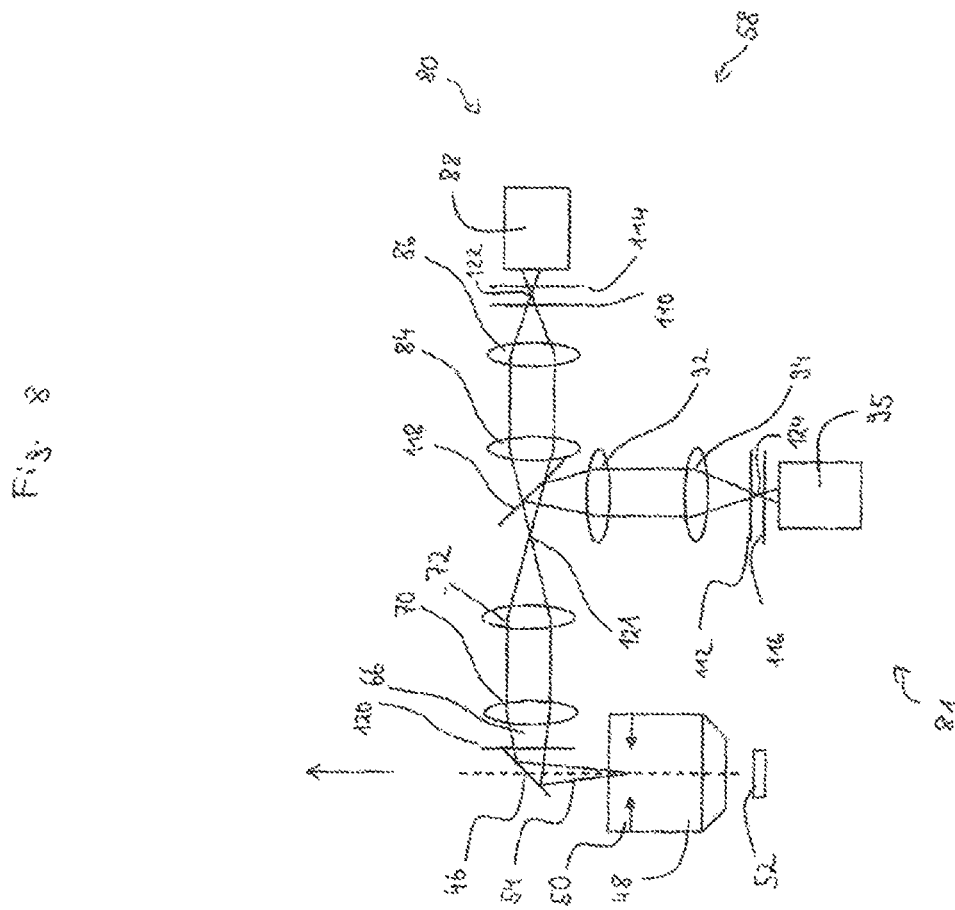
FIG. 8 shows an embodiment, which is modified compared to the embodiment according to FIGS. 6 and 7, in which the pairs of filters are arranged perpendicular to the optical axis of the detection beam path.

FIG. 8 shows a view of the pupil imaging corresponding to FIG. 7 for a modified embodiment, in which the filters 110, 112, 114 and 116 are not placed obliquely, but are oriented at a right angle to the optical axis of the detection beam path 66. Accordingly, the filters 110, 112, 114 and 116 in this embodiment are arranged, contrary to the purely schematic view according to FIG. 8, practically at the respective location of the pupil image.

Figure 9:
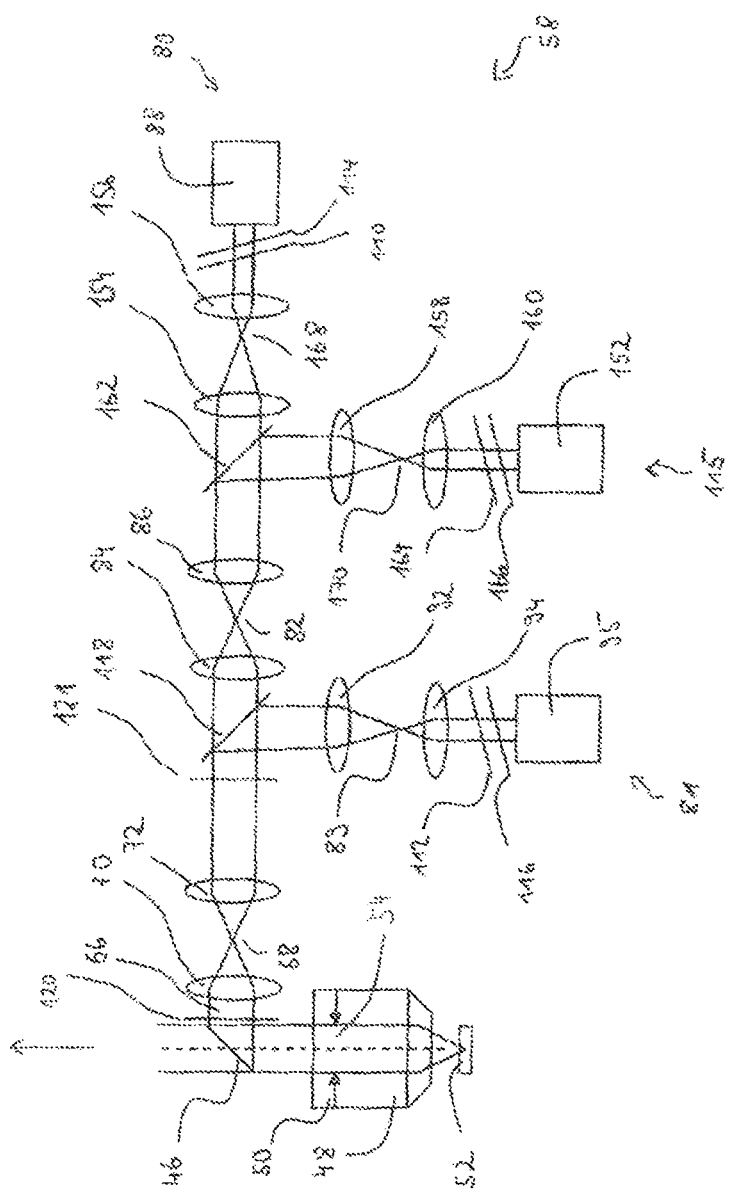
FIG. 9 shows a further embodiment of the scanning microscope having a further detection module.
Figure 10:
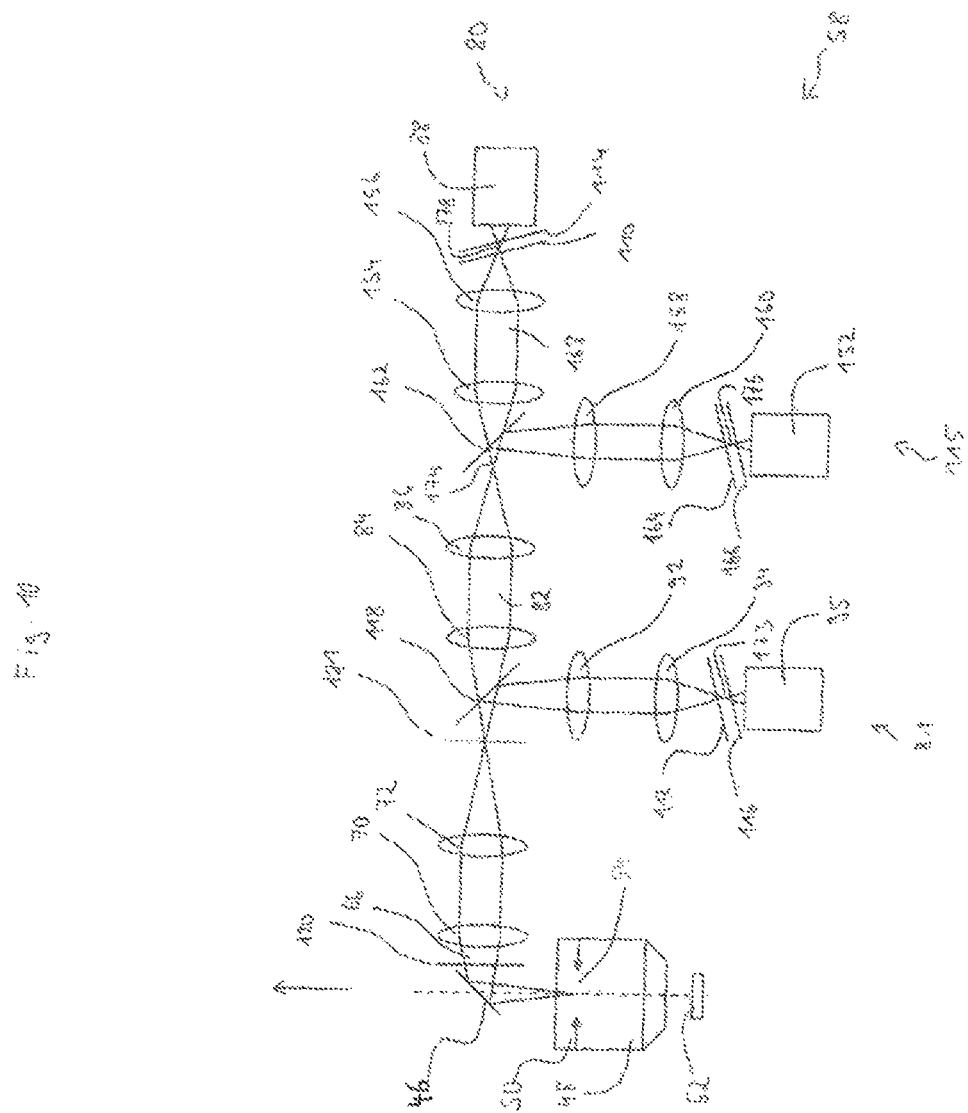
FIG. 10 shows the beam path of the pupil imaging for the embodiment shown in FIG. 9.

FIGS. 9 and 10 show a further embodiment which, compared to the embodiment according to FIGS. 6 and 7, contains a further detection module 115 having an additional detector 152. Accordingly, further lenses 154, 156, 158 and 160 are provided in the detection beam path 66. Moreover, the detection beam path 66 contains a further beam splitter 162 as well as a longpass filter 164 and a shortpass filter 166, which are arranged upstream of the detector 152 and in combination form a bandpass filter. The additional intermediate image planes, in which an intermediate image of the sample 52 is produced in each case, are designated 168 and 170 in FIG. 9. Furthermore, additional locations 173, 174, 176 and 178 of a pupil image can be inferred from the view of the pupil imaging according to FIG. 10.

Figure 11:
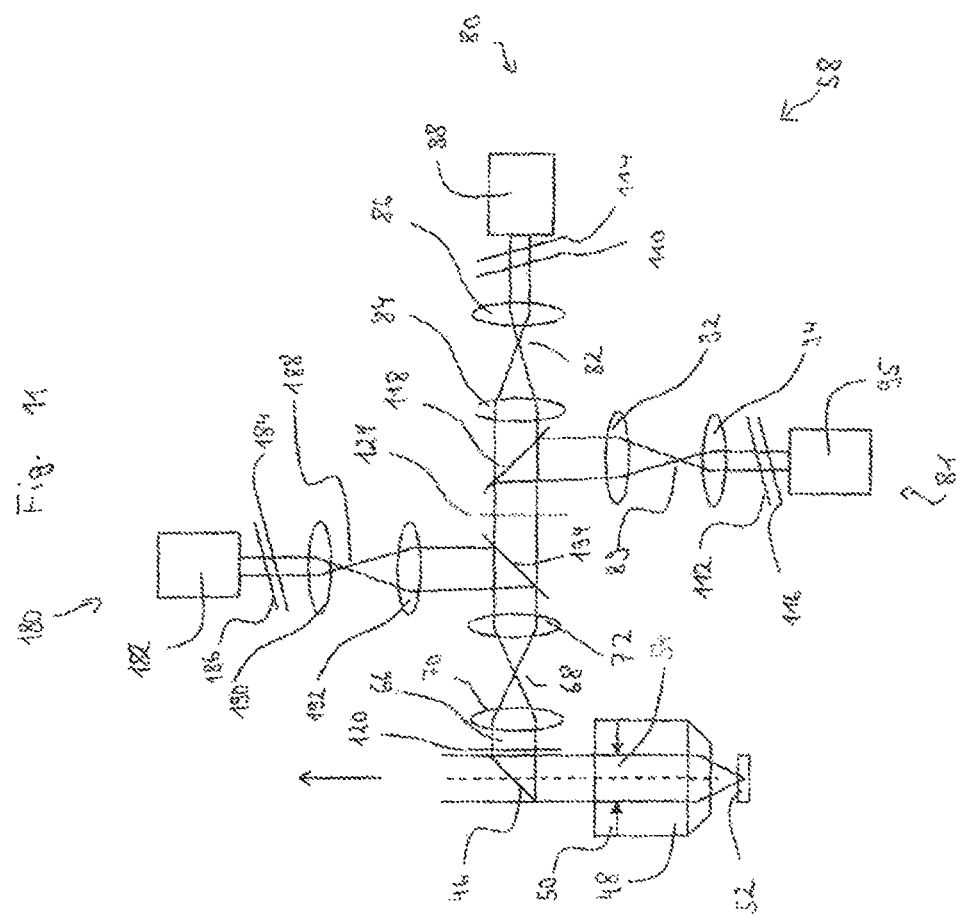
FIG. 11 shows a further embodiment of the scanning microscope.

FIG. 11 shows an embodiment which is modified compared to the arrangement shown in FIGS. 9 and 10 and in which the detection module 115 is replaced by a detection module 180. The detection module 180 contains a detector 182, upstream of which are arranged a longpass filter 184 and a shortpass filter 186, which in combination form a bandpass filter. Furthermore, on both sides of an intermediate image plane 188, in which an image of the sample 52 is produced, the detection module 180 contains two further lenses 190 or 192.

In addition to the beam splitter 118, the detection beam path 66 in this embodiment contains a further beam splitter 194 of the type shown in FIG. 1. The two beam splitters 118 and 194 are arranged at the same spacing, which is fixed according to the relationship (1) or (2), before or behind the location 121 of the pupil imaging. This allows a particularly compact structure since, compared to the embodiment of FIGS. 9 and 10, the number of optical elements can be reduced.

Figure 12:
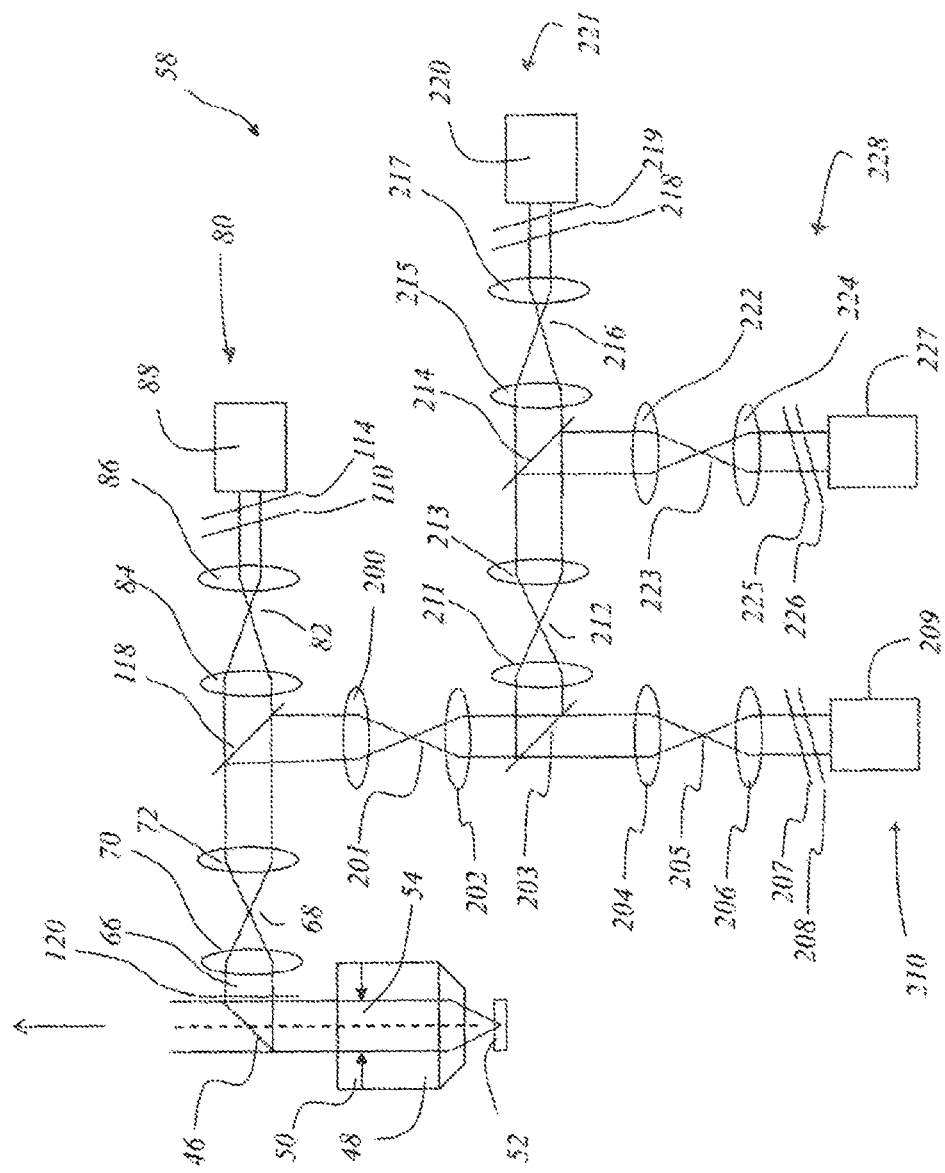
FIG. 12 shows a further embodiment of the scanning microscope to illustrate a beam splitter cascade according to the invention.

FIG. 12 shows a further embodiment of the scanning microscope 20, which refers back to the embodiment according to FIG. 11.

The embodiment according to FIG. 12 contains the non-descanned detection unit 58 which in total comprises four detection modules, namely the detection module 80 and three further detection modules 210, 221 and 228. The detection light bundle 54 is fed, spectrally separated, by means of a beam splitter cascade to the detection modules 80, 210, 221 and 228 in the manner described below. This beam splitter cascade is formed from the beam splitter 118 and further beam splitters 203 and 214. In this case, the spectrally selective beam splitters 118, 203 and 214 are arranged in the detection beam path 66 with their active surfaces at an angle of 45° in each case to the optical axis of the detection beam path 66. Moreover, the beam splitters 118, 203 and 214 are in each case arranged downstream of the location of an image of the objective pupil 50 at a spacing which is predetermined in accordance with the conditions (1) or (2).

The embodiment according to FIG. 12 takes into account the circumstance that the beam splitters 118, 203 and 214 in each case reflect a larger spectral range of the detection light bundle 54 in relation to the spectral edge than they transmit. The embodiment according to FIG. 12 therefore provides a cascading of the detection modules 80, 210, 221 and 228 by the reflection at the beam splitters 118, 203 and 214. This embodiment furthermore takes into account the circumstance that only a maximum of that spectral proportion of the detection light bundle 54 can be fed to each of the detection modules 80, 210, 221 and 228, which is not detected by the respective other detection modules. Accordingly, the embodiment of FIG. 12 provides a cascading not only by the beam splitter reflection, but also by the wavelengths of the spectral proportions, which are detected by the detection modules 80, 210, 221 and 228. The cascading mentioned last takes place beginning with the largest wavelength through to shorter wavelengths.

In detail, the beam splitter 118 transmits the spectral proportion of the detection light bundle 54, which has the greatest wavelengths within the detection light, into the detection module 80. This longwave spectral proportion, after passage through the lenses 84, 86 and the obliquely placed pair of filters, which is formed by the longpass filter 110 and the shortpass filter 114, thus arrives at the detector 88. The remaining spectral proportion of the detection light is reflected at the beam splitter 118 by lenses 201, 202 onto the beam splitter 203. The beam splitter 203 transmits that spectral proportion, which has the greatest wavelengths within the detection light fed to it, into the detection module 210. After passage through lenses 204, 206 and an obliquely placed pair of filters, which is formed from a longpass filter 207 and a shortpass filter 208, the spectral proportion of the detection light transmitted by the beam splitter 203 arrives at a detector 209. The remaining spectral proportion of the detection light is fed by the beam splitter 203 by reflection via lenses 211, 213 to the beam splitter 214.

The beam splitter 214 transmits that spectral proportion which has the greatest wavelengths within the detection light fed to it into the detection module 221. After passage through lenses 215, 217 and an obliquely placed pair of filters, which is formed from a longpass filter 218 and a shortpass filter 219, this transmitted spectral proportion arrives at a detector 220. The beam splitter 214 reflects the remaining spectral proportion of the detection light fed to it, so that this spectral proportion, after passage through lenses 222, 224 and an obliquely placed pair of filters which is formed from a longpass filter 225 and 226, arrives at a detector 227.

In the arrangement according to FIG. 12, the reference numerals 201, 205, 212, 216 and 223 designate locations at which an intermediate image of the sample 52 is produced.

The arrangement according to FIG. 12 thus provides that the detection light bundle 54 on its way to the detectors 88, 209, 220 and 227 in each case only undergoes precisely one transmission at one of the beam splitters 118, 203 and 214. With regard to the light yield, this is advantageous as the degrees of reflection of the beam splitters 118, 203 and 214 are higher than their degrees of transmission.

Figure 13:
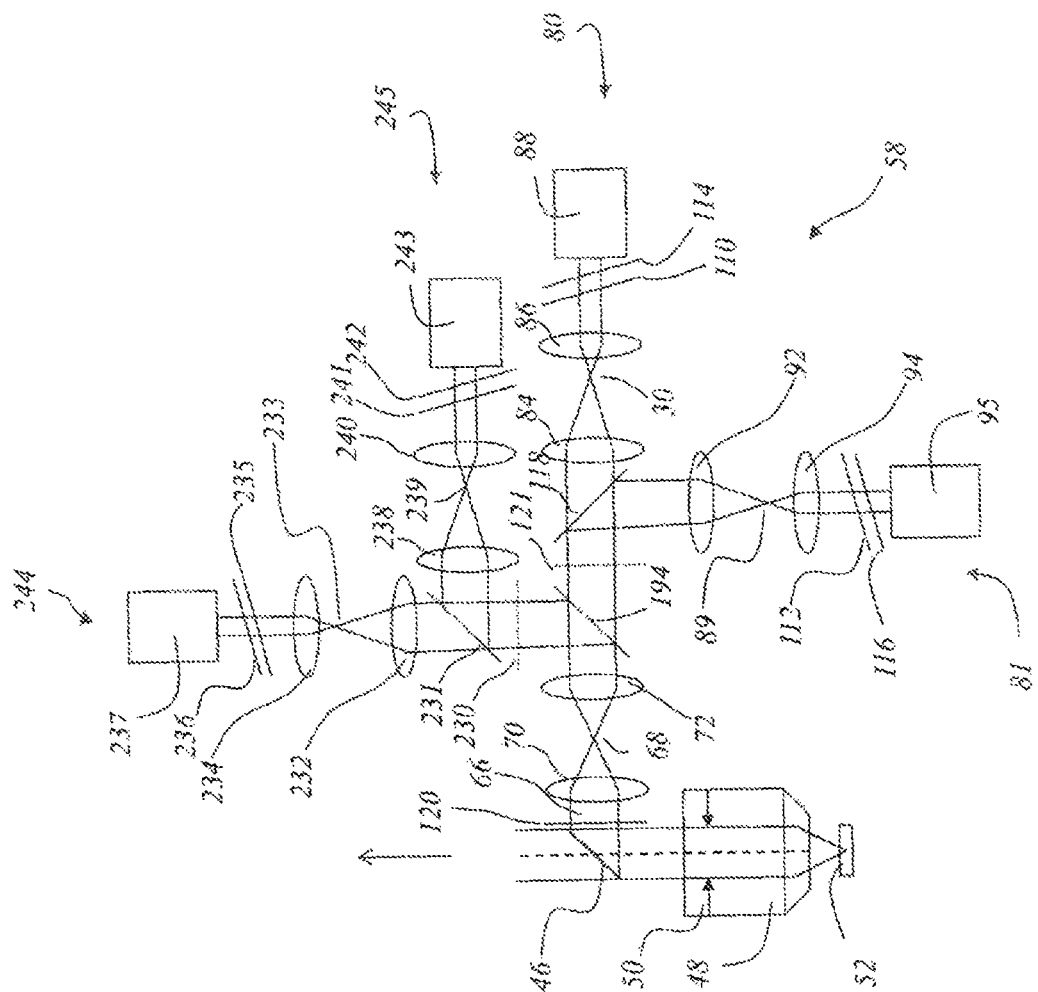
FIG. 13 shows a further embodiment of the scanning microscope.

FIG. 13 shows a further embodiment of the scanning microscope 20, which refers back to the embodiment according to FIG. 11. In the arrangement according to FIG. 11, the two beam splitters 194, 118 are provided, which are arranged upstream or downstream of the location 121 of the pupil image. If it is assumed that the two beam splitters 118 and 194 have the same dispersion, their spacing from the location 121 of the pupil image is also the same. The arrangement according to FIG. 11 in total comprises three detection modules 80, 81 and 180.

In extension of the arrangement according to FIG. 11, the embodiment shown in FIG. 13 provides a total of four detection modules, namely the two detection modules 80, 81 and two further detection modules 244, 245. Like the two detection modules 80, 81, the detection modules 244, 245 also have two lenses 232, 234 or 238, 240 in each case, as well as an obliquely placed pair of filters which is formed from a longpass filter 235 or 241 and a shortpass filter 236 or 242, and a detector 237 or 243.

In addition, the embodiment according to FIG. 13 has a further beam splitter 231, which forms a spectrally selective component 10 according to the invention of the type shown in FIG. 1. The beam splitter 231, like the beam splitter 194, is obliquely placed in the detection beam path 66. The beam splitter 118 is arranged downstream of a location 230, in which an image of the objective pupil 50 is produced, at a spacing which is predetermined according to the conditions (1) or (2). If it is assumed that the beam splitter 231 has a dispersion which is equal to the dispersion of the beam splitter 194, the beam splitters 194, 231 have the same spacing from the location 230.

In the arrangement according to FIG. 13, the reference numerals 233 and 239 designate locations in which an intermediate image of the sample 52 is produced in each case.

Figure 14:
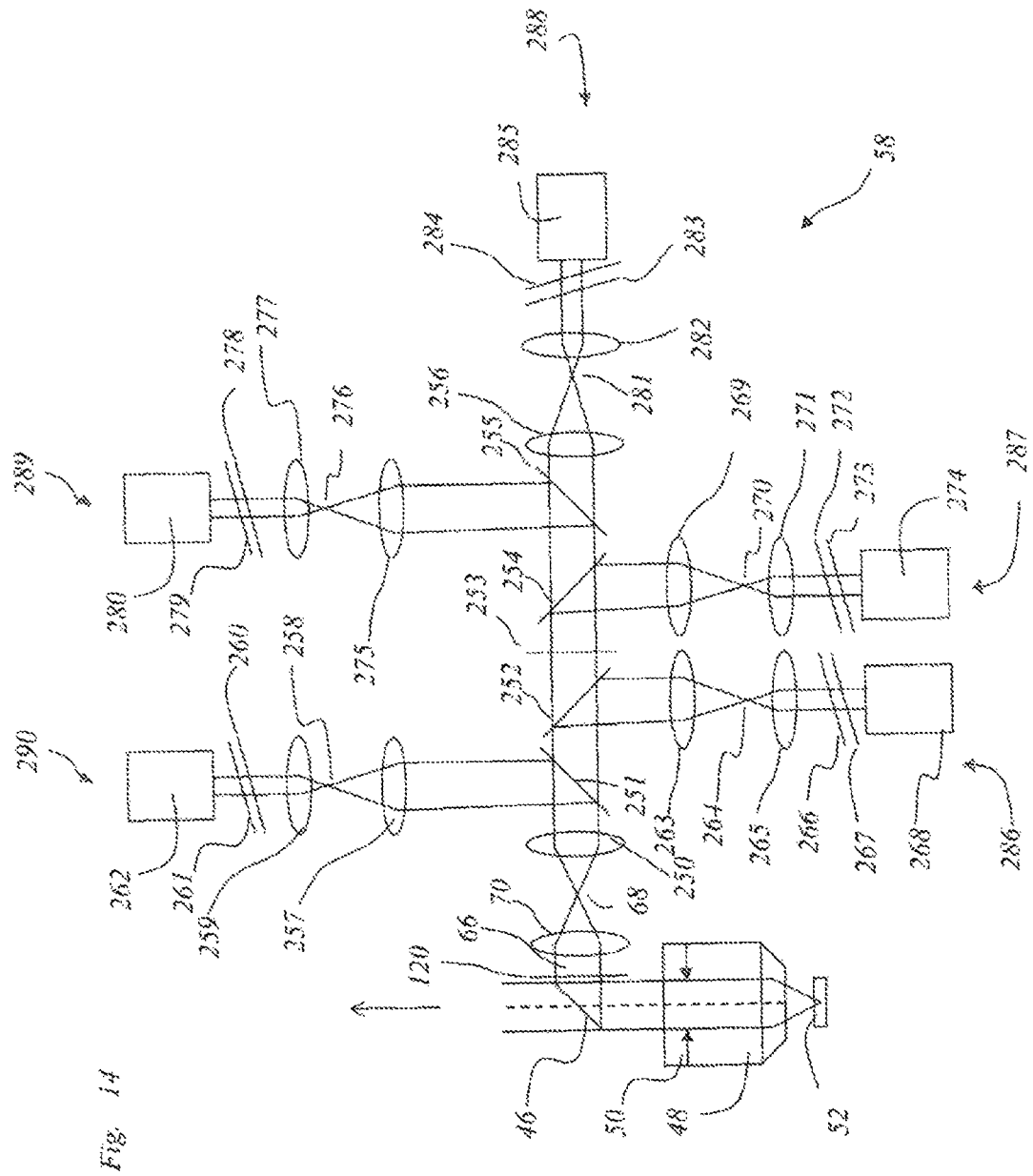
FIG. 14 shows a further embodiment of the scanning microscope, in which beam splitters with a different dispersion are used.

FIG. 14 shows an embodiment in which beam splitter pairs 251, 252 or 254, 255 are provided, the beam splitters of which have a different dispersion and therefore different spacings from a location of the pupil imaging designated 253 in FIG. 14.

The embodiment according to FIG. 14 comprises a total of five detection modules 286, 287, 288, 289 and 290. Each of these detection modules contains two lenses 263, 265, 269, 271, 256, 282, 275, 277, 257, 259 and an obliquely placed pair of filters, which is formed from a longpass filter 266, 272, 283, 278, 260 and a shortpass filter 267, 273, 284, 279, 261, and a detector 268, 274, 285, 280, 262.

As mentioned above, the two beam splitters 251, 252, as a result of their different dispersion, may be arranged at different spacings from the location 253 of the pupil imaging. Thus, in a compact arrangement, a plurality of beam splitters may be arranged upstream of the location 253 of the pupil imaging. The same applies to the downstream arrangement of the two beam splitters 254, 255, which are located on the other side of the location 253.

Figure 15:
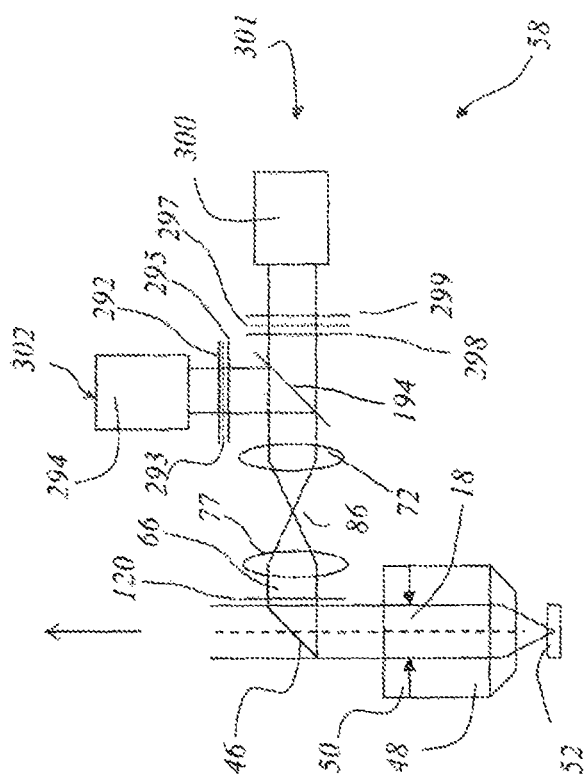
FIG. 15 shows a further embodiment of the scanning microscope, in which no further imaging optical system is arranged in the detection channels between the beam splitter and the next spectrally selective component.

FIG. 15 shows an embodiment having two detection modules 301, 302, which in each case have a detector 300 or 294 and a pair of filters, which is arranged upstream of the respective detector and is formed from a longpass filter 298 or 295 and a shortpass filter 299 or 292. In contrast to the embodiments according to FIGS. 2 and 6 to 14, the longpass filters 298 or 295 and shortpass filters 299 or 292 adjoin the beam splitter 194, in each case without a further imaging optical system.

In order to keep the arrangement according to FIG. 15 particularly compact, the pairs of filters 298, 299 or 295, 292 are not placed obliquely in the detection beam path 66, but are arranged with their surface normals parallel to the optical axis of the detection beam path 66. Accordingly, the pairs of filters 298, 299 or 295, 292 are located at the location 297 or 293 of the pupil imaging (or in each case in the direct vicinity of this location).

Figure 16:
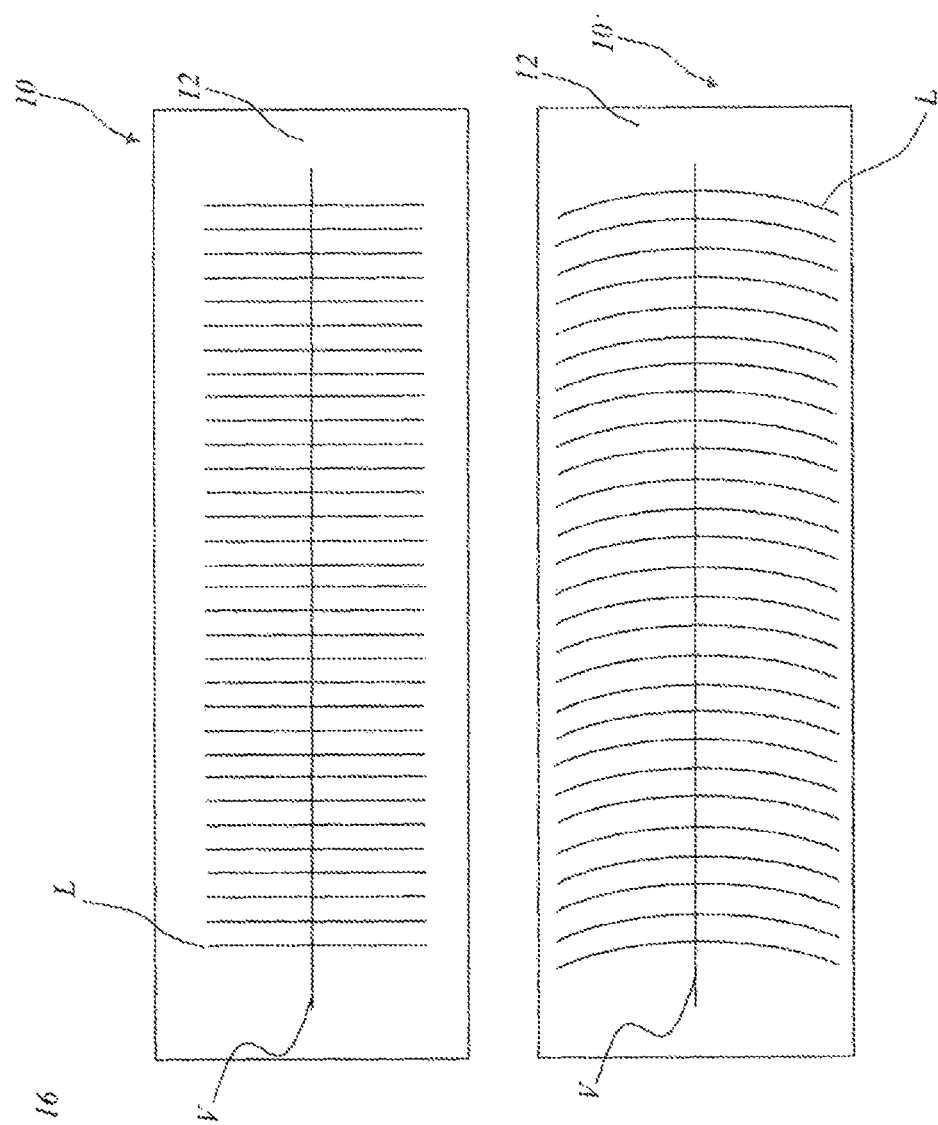
FIG. 16 shows a modification of the spectrally selective component according to FIG. 1.

A modification of the spectrally selective component 10 shown in FIG. 1 is shown in FIG. 16. This modification designated 10' is shown in the lower partial image of FIG. 16. For comparison, an embodiment corresponding to FIG. 1 is shown in the upper partial image.

In FIG. 16, V in turn designates the variation or dispersion axis, along which the spectral edge of the active surface 12 of the component 10 varies. The lines running transversely to the variation axis V and designated L in FIG. 16 indicate locations of the same spectral edge in the manner of a contour view. As can be inferred from the upper partial image of FIG. 16, the lines L for the component 10 run perpendicularly to the variation axis V. This means that in the component 10 in a direction perpendicular to the variation axis V no change of the spectral edge occurs.

In contrast, the lines L in the modified component 10' are curved in their course transverse to the variation axis V. Therefore, in the component 10' in a direction perpendicular to the variation axis V, a change of the spectral edge occurs. This change of the spectral edge perpendicular to the variation axis V can be used in the manner described above to take into account the circumstance that in a two-dimensional scanning of the sample, the actual angle of incidence of the detection light bundle on the spectrally selective component is composed of two scanning angles, which refer to axes that are perpendicular to one another.

Figure 17:
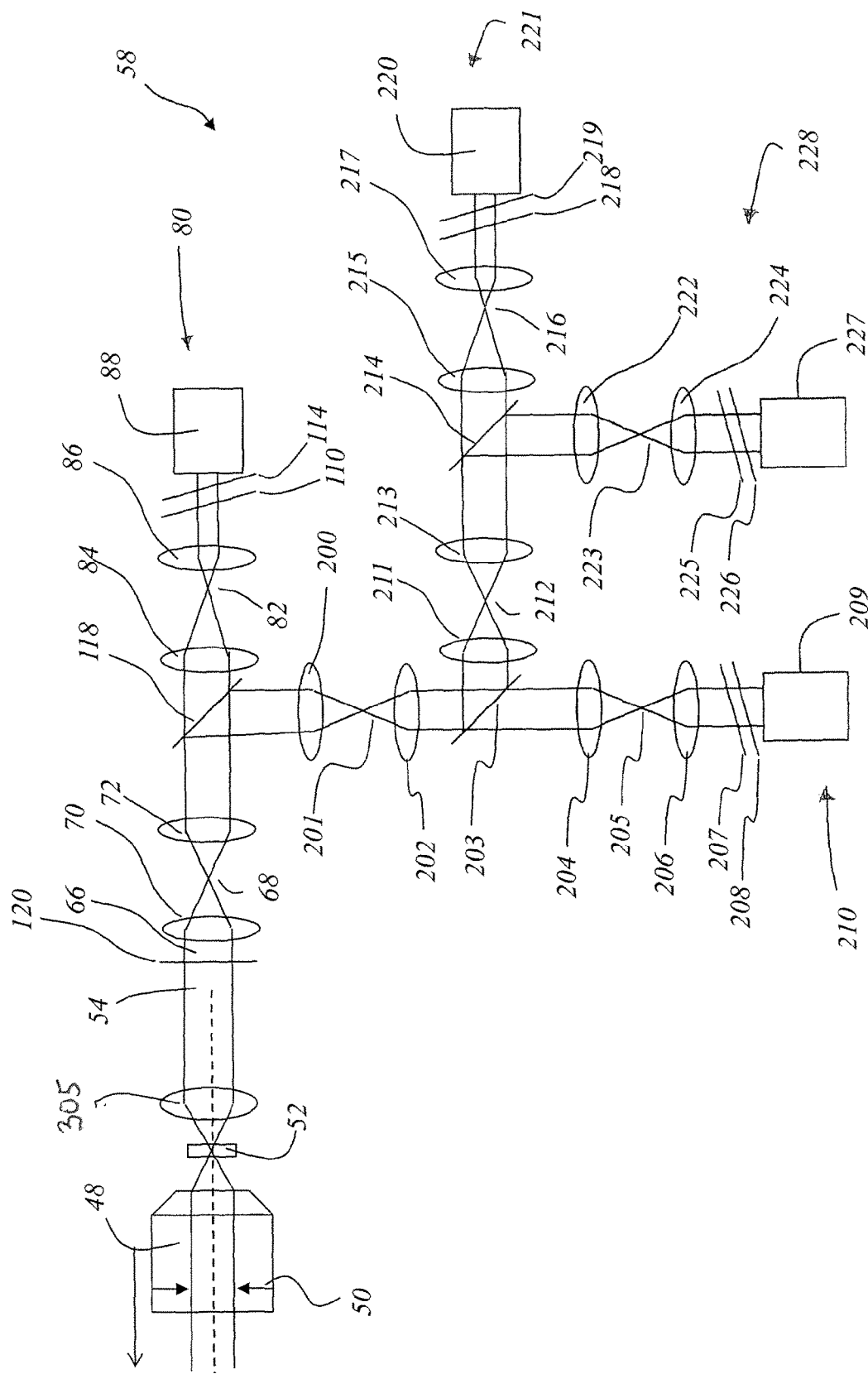
FIG. 17 shows a further embodiment of the scanning microscope, in which the detection light arrives at the detection units via an optical system that is separate from the illuminating objective.

FIG. 17 finally shows a further embodiment of the scanning microscope. This differs from the previously described embodiments in which the objective 48 is used both for illumination and for detection in that the objective 48 is used here solely to illuminate a sample 52. The detection arrangement according to FIG. 17 accordingly works with detection light, which no longer arrives back in the objective 48. Rather, in the embodiment according to FIG. 17, an optical system 305, which collects the detection light bundle 54 and transports it onward in the direction of the detection units 80, 210, 221 and 258, is arranged downstream of the sample 52. The optical system 305 is, for example, configured as an objective or condenser. The beam splitter 46 shown in FIG. 12 can be dispensed with in this embodiment.

The detection arrangement working with transmitted light and described above with reference to FIG. 17 refers back to the embodiment according to FIG. 12. However, it should be expressly pointed out that all the embodiments described above can be modified in the manner shown in FIG. 17.

Finally, for the sake of completeness it is again pointed out that in the detection arrangements described above, with the exception of the beam splitter 46 and the filter 120, all the beam splitters and filters, i.e. edge filters, longpass filters and shortpass filters, form spectrally selective components of the type according to the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A scanning microscope comprising:
an objective arranged in an illuminating beam path and configured to focus an illuminating light bundle onto a sample;
a scanning unit arranged upstream of the objective in the illuminating beam path and configured to deflect the illuminating light bundle in such a way that the illuminating light bundle focused by the objective executes a scanning movement on the sample; and
a detection unit arranged in a detection beam path and configured to receive a detection light bundle not deflected by the scanning unit, wherein for spectral influencing of the detection light bundle, the detection unit contains at least one spectrally selective component which has an active surface with a spectral edge which monotonically varies with a variation of a location of incidence of the detection light bundle on the active surface,
wherein the active surface of the spectrally selective component is arranged in the detection beam path obliquely to the optical axis of the detection beam path in a position at which a monotonic variation of the spectral edge of the active surface, caused by a variation of an angle of incidence at which the detection light bundle strikes the active surface occurring as a result of the scanning movement of the illuminating light bundle, is opposed to and compensated for, at least in part, by the monotonic variation of the spectral edge of the active surface, which is caused by the variation of the location at which the detection light bundle strikes the active surface.

2. The scanning microscope according to claim 1, wherein the active surface of the spectrally selective component along the optical axis of the detection beam path has a spacing ($\Delta z$) from the location of the image of the objective pupil, which is predetermined depending on the variation of the angle of incidence of the detection light bundle.

3. The scanning microscope according to claim 2, wherein the spacing $\Delta z > 0$ is predetermined in such a way that for all scanning angles $\vartheta$ the following condition is fulfilled:

$$\Delta z \leq 2ES(\vartheta,\varphi)/ED \sin(\vartheta+\varphi)/\sin(\vartheta), \quad (1)$$

wherein $ES(\vartheta, \varphi)$ designates the variation of the spectral edge of the active surface occurring at the scanning angle $\vartheta$ and an angle $\varphi$, ED designates the change in the spectral edge per section on the active surface and $\varphi$ designates the angle, at which the active surface is arranged with respect to the optical axis of the detection beam path.

4. The scanning microscope according to claim 2, wherein the spacing is predetermined in such a way that a deviation of the spectral edge from a desired edge position is as small as possible for all the scanning angles.

5. The scanning microscope according to claim 1, wherein the active surface of the spectrally selective component is arranged in the detection beam path in such a way that the surface normal of the active surface to the optical axis of the detection beam path is inclined by a predetermined angle.

6. The scanning microscope according to claim 5, wherein the predetermined angle is equal to or less than 65°.

7. The scanning microscope according to claim 1, wherein the active surface of the spectrally selective component is configured in such a way that the spectral edge varies substantially linearly with the angle of incidence at which the detection light bundle strikes the active surface.

8. The scanning microscope according to claim 1, wherein the angle of incidence, which varies according to the scanning movement of the illuminating light bundle and at which the detection light bundle strikes the active surface of the spectrally selective component, is limited to an angle range, in which the location of the incidence of the detection light bundle on the active surface varies approximately linearly with the angle of incidence.

9. The scanning microscope according to claim 1, wherein the at least one spectrally selective component comprises at least one beam splitter and/or at least one edge filter.

10. The scanning microscope according to claim 9, wherein the at least one edge filter comprises at least one shortpass filter, at least one longpass filter and/or at least one bandpass filter.

11. The scanning microscope according to claim 10, wherein the bandpass filter is formed from a shortpass filter and a longpass filter, which are arranged one behind the other along the optical axis of the detection beam path.

12. The scanning microscope according to claim 1, wherein the active surface of the spectrally selective component is configured in such a way that the spectral edge along a variation axis varies linearly or non-linearly with the location of the incidence of the detection light bundle.

13. The scanning microscope according to claim 12, wherein the spectral edge of the active surface along the variation axis varies linearly with the location of the incidence of the detection light bundle if the active surface is arranged at the location of an image of the objective pupil, and varies non-linearly if the active surface is arranged at the position at which the variation of the spectral edge caused by the variation of the angle of incidence is compensated for.

14. The scanning microscope according to claim 12, wherein the detection unit has an optical system arranged upstream of the spectrally selective component in the detection beam path, the optical system having a different optical effect in a direction parallel to the variation axis than in a direction perpendicular to the variation axis.

15. The scanning microscope according to claim 1, wherein the detection unit includes at least two detection modules, the at least one spectrally selective component comprising at least one beam splitter, which is configured to feed the detection light bundle, spectrally separated, to the two detection modules.

16. The scanning microscope according to claim 15, wherein the at least one beam splitter comprises at least two beam splitters, of which one is arranged in the detection beam path upstream of the image of the objective pupil at a predetermined spacing and another one is arranged downstream of the image of the objective pupil at the same spacing.

17. The scanning microscope according to claim 16, wherein the detection unit has a beam splitter cascade, which is formed by the at least one spectrally selective component and comprises at least a first beam splitter and a second beam splitter, and has at least a first detection module, a second detection module and a third detection module, the first beam splitter feeding the detection light bundle, spectrally separated, by transmission to the first detection module and by reflection to the second beam splitter, and the second beam splitter feeding the detection light bundle reflected by the first beam splitter, spectrally separated, by transmission to the second detection module and by reflection, directly or indirectly via a further beam splitter, to the third detection module.

18. The scanning microscope according to claim 17, wherein the beam splitters are configured in such a way that the wavelengths of the spectral proportions of the detection light bundle, which the beam splitters feed to the respective associated detection modules in each case by transmission, successively reduce within the beam splitter cascade.

19. The scanning microscope according to claim 15, wherein the at least one beam splitter includes at least two beam splitters including at least one first beam splitter, which is arranged in the detection beam path upstream of the image of the objective pupil, and at least one second beam splitter, which is arranged in the detection beam path downstream of the image of the objective pupil.

20. The scanning microscope according to claim 19, wherein the first and the second beam splitter have the same dispersion and are arranged at the same spacing from the image of the object pupil, the dispersion corresponding to a change of the spectral edge per section on the active surface.

21. The scanning microscope according to claim 19, wherein the at least one first beam splitter comprises at least two beam splitters which are arranged upstream of the image of the objective pupil at various spacings and have a different dispersion, and/or wherein the at least one second beam splitter comprises at least two beam splitters which are arranged downstream of the image of the objective pupil at different spacings and have a different dispersion.

22. The scanning microscope according to claim 16, wherein the at least one spectrally selective component comprises at least one edge filter which, in at least one of the detection modules which has a detector without a further imaging optical system, adjoins the beam splitter, the at least one edge filter being arranged upstream of the detector and the active surface being arranged substantially at the location of the image of the objective pupil.

23. The scanning microscope according to claim 1, wherein the detection unit contains at least one aspherical lens.

24. The scanning microscope according to claim 1, wherein the active surface of the spectrally selective component is polarization-sensitive.

25. The scanning microscope according to claim 1, wherein the spectrally selective component is adjustable to change the location of the incidence of the detection light bundle on the active surface.

26. The scanning microscope according to claim 1, wherein the objective is configured both to focus the illuminating light bundle onto the sample and to receive the detection light bundle.

27. The scanning microscope according to claim 1, wherein the objective is only configured to focus the illuminating light bundle onto the sample, and wherein an optical system is arranged in the detection beam path so as to receive the detection light bundle.

28. A scanning microscope comprising:
an objective arranged in an illuminating beam path and configured to focus an illuminating light bundle onto a sample;
a scanning unit arranged upstream of the objective in the illuminating beam path and configured to deflect the illuminating light bundle in such a way that the illuminating light bundle focused by the objective executes a scanning movement on the sample; and
a detection unit arranged in a detection beam path and configured to receive a detection light bundle not deflected by the scanning unit, wherein for spectral influencing of the detection light bundle, the detection unit contains at least one spectrally selective component which has an active surface with a spectral edge which varies with a variation of a location of incidence of the detection light bundle on the active surface,
wherein the active surface of the spectrally selective component is arranged in the detection beam path in a position at which a variation of the spectral edge of the active surface, caused by a variation of an angle of incidence at which the detection light bundle strikes the active surface occurring as a result of the scanning movement of the illuminating light bundle, is opposed to and compensated for, at least in part, by the variation of the spectral edge of the active surface, which is caused by the variation of the location at which the detection light bundle strikes the active surface,
wherein the active surface of the spectrally selective component along the optical axis of the detection beam path has a spacing ($\Delta z$) from the location of the image of the objective pupil, which is predetermined depending on the variation of the angle of incidence of the detection light bundle, and
wherein the spacing $\Delta z>0$ is predetermined in such a way that for all scanning angles $\vartheta$ the following condition is fulfilled:

$$\Delta z \leq 2 \frac{ES(\vartheta, \varphi)}{ED} \frac{\sin(\vartheta + \varphi)}{\sin(\vartheta)}, \tag{1}$$

wherein $ES(\vartheta, \varphi)$ designates the variation of the spectral edge of the active surface occurring at the scanning angle $\vartheta$ and an angle $\varphi$, ED designates the change in the spectral edge per section on the active surface and $\varphi$ designates the angle, at which the active surface is arranged with respect to the optical axis of the detection beam path.

* * * * *